United States Patent
Seregin et al.

(10) Patent No.: US 11,910,024 B2
(45) Date of Patent: Feb. 20, 2024

(54) BOUNDARY HANDLING FOR ADAPTIVE LOOP FILTERING

(71) Applicant: QUALCOMM Incorporated, San Diego, CA (US)

(72) Inventors: Vadim Seregin, San Diego, CA (US); Nan Hu, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/814,597

(22) Filed: Mar. 10, 2020

(65) Prior Publication Data

US 2020/0296425 A1    Sep. 17, 2020

Related U.S. Application Data

(60) Provisional application No. 62/816,728, filed on Mar. 11, 2019.

(51) Int. Cl.
*H04N 19/00* (2014.01)
*H04N 19/82* (2014.01)
*H04N 19/117* (2014.01)

(52) U.S. Cl.
CPC ........... *H04N 19/82* (2014.11); *H04N 19/117* (2014.11)

(58) Field of Classification Search
CPC ............................... H04N 19/00; H04N 21/00
See application file for complete search history.

(56) References Cited

U.S. PATENT DOCUMENTS

| 8,548,041 B2 | 10/2013 | Fu et al. |
| 9,525,884 B2 | 12/2016 | Huang et al. |

(Continued)

FOREIGN PATENT DOCUMENTS

| JP | 2021505074 A | 2/2021 |
| WO | 2013063455 A1 | 5/2013 |

(Continued)

OTHER PUBLICATIONS

Bross B., et al., "Versatile Video Coding (Draft 23)", JVET-L1001-V1, Joint Video Experts Team (JVET) of ITU-T SG 16 WP 3 and ISO/IEC JTC 1/SC 29/WG 11, 12th Meeting: Macao, CN, Oct. 3-12, 2018, 165 Pages.

(Continued)

*Primary Examiner* — Maryam A Nasri
(74) *Attorney, Agent, or Firm* — Shumaker & Sieffert, P.A.

(57) ABSTRACT

A video encoder and/or video decoder are configured to apply an adaptive loop filter to a reconstructed block of video data. The video encoder and/or video decoder may be configured to determine a value of a gradient for a sample in the reconstructed block of video data, including performing a gradient calculation for the sample using an available sample that corresponds to an unavailable sample that is outside of one of: a picture, a slice, a tile, or a tile group that includes the reconstructed block of samples, determine an adaptive loop filter for the reconstructed block of video data based at least in part on the determined value of the gradient for the sample, and apply the determined adaptive loop filter to the reconstructed block of video data to generate a filtered block of video data.

28 Claims, 17 Drawing Sheets

(56) References Cited

U.S. PATENT DOCUMENTS

| | | | |
|---|---|---|---|
| 9,641,866 | B2 | 5/2017 | Chong et al. |
| 10,057,574 | B2 | 8/2018 | Li et al. |
| 2019/0166363 | A1 | 5/2019 | Zhang et al. |
| 2019/0166375 | A1* | 5/2019 | Jun ................ H04N 19/176 |
| 2019/0373258 | A1 | 12/2019 | Karczewicz et al. |
| 2021/0051329 | A1* | 2/2021 | Ko .................. H04N 19/105 |

FOREIGN PATENT DOCUMENTS

| | | |
|---|---|---|
| WO | 2013174254 A1 | 11/2013 |
| WO | 2018026166 A1 | 2/2018 |
| WO | WO-2019107994 A1 | 6/2019 |

OTHER PUBLICATIONS

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.

Chen C-Y., et al., "Adaptive Loop Filter with Virtual Boundary Processing", 13. JVET Meeting, Jan. 9, 2019-Jan. 18, 2019, Marrakech, (The Joint Video Exploration Team of ISO/IEC JTC1/SC29/WG11 and ITU-T SG. 16), No. JVET-M0164, Jan. 12, 2019 (Jan. 12, 2019), XP030201708, 6 pages, Retrieved from the Internet: URL: http://phenix.int-evry.fr/jvet/doc_end_user/documents/13_Marrakech/wg11/JVET-M0164-v4.zip, JVET-M0164-v1.docx, [retrieved on Jan. 12, 2019], cited in the application, Section 2, figures 4-6.

Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.

Chen J., et al., "Algorithm Description for Versatile Video Coding and Test Model 5 (VTM 5)", 14th JVET Meeting; Mar. 19, 2019-Mar. 27, 2019; Geneva; (The Joint Video Exploration Team of ISO/IEC JTC1/SC29/WG11 and ITU-T SG. 16), No. JVET-N1002, May 21, 2019, XP030205194, Retrieved from the Internet: URL:http://phenix.int-evry.fr/jvet/doc_end_user/documents/14_Geneva/wg11/JVET-N1002-v1.zip JVET-N1002-v1.docx, 70 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ , No. JVET-A1001 Feb. 24, 2016 (Feb. 24, 2016), XP030150000, 27 pages.

Chen J., et al., "JVET-G1001: Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting: Jul. 13, 2017-Jul. 21, 2017, Torino, Aug. 19, 2017 (Aug. 9, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7-p. 23, Paragraph 2.3.7.6, p. 17, Paragraph 2.3.5-p. 18, section 2, sections 2.1.1. 2.3.1.

Ergen S., "ZigBee/IEEE 802.15.4 Summary", Sep. 10, 2004, 37 Pages.

Fu C-M., et al., "CE8.c.5: Non-Cross-Slices SAO", 7. JCT-VC Meeting, 98. Meeting, Nov. 21, 2011-Nov. 30, 2011, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-G207, Nov. 7, 2011 (Nov. 7, 2011), XP030110191, pp. 1-5, Section 2, figure 3.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

"Information technology—Dynamic Adaptive Streaming over Http {Dash}—Part 1: Media Presentation Description and Segment Formats," ISO/IEC 23009-1, International Standard, Draft third edition, Jan. 9, 2017, 216 pp.

International Search Report and Written Opinion—PCT/US2020/022132—ISAEPO—dated May 12, 2020, 16 Pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.

Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-C0038, 3rd Meeting: Geneva, CH, , May 26-Jun. 1, 2016, 4 pages.

Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://phenix.int-evry.fr/jvet/ ., No. JVET-B0060-r1, 6 pages.

Kotra A.M., et al., "Non-CE: Loop filter line buffer reduction", Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0301-V2, pp. 1-12.

Lim S.C., et al., "CE2: Subsampled Laplacian Calculation (Test 6.1, 6.2, 6.3, and 6.4)", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0147, pp. 1-8.

Ohm J-R., et al., "MPEG-4 Advanced Video Coding", MPEG Doc#: N7314, Jul. 2005, 11 Pages.

Hu N., et al., "AHG12/Non-CE5: Unification of Boundary Handling for Adaptive Loop filter", Joint Video Experts Team (JVET) of ITU-T SG 16 WP 3 and ISO/IEC JTC 1/SC 29/WG 11, JVET-O0654-v3, 15th Meeting: Gothenburg, SE, Jul. 3-12, 2019, pp. 1-16.

Hu N., et al., "AHG16/Non-CE5: On ALF Boundary Padding", Joint Video Experts Team (JVET) of ITU-T SG 16 WP 3 and ISO/IEC JTC 1/SC 29/WG 11, JVET-P0551-v2, 16th Meeting: Geneva, CH, Oct. 1-11, 2019, pp. 1-5.

Hu N., et al., "CE5-related: Unification of Picture Boundary and Line Buffer Handling for ALF", Joint Video Experts Team (JVET) of ITU-T SG 16 WP 3 and ISO/IEC JTC 1/SC 29/WG 11, JVET-N0416-v2, 14th Meeting: Geneva, CH, Mar. 19-27, 2019, pp. 1-7.

Kotra Y., et al., "Non-CE5: Modified ALF Filtering for Slice, Brick and Virtual Boundaries", Joint Video Experts Team (JVET) of ITU-T SG 16 WP 3 and ISO/IEC JTC 1/SC 29/WG 11, JVET-O0662-v4, 15th Meeting: Gothenburg, SE, Jul. 3-12, 2019, pp. 1-7.

Liu H., et al., "Non-CE5: Padding Method for Samples at Variant Boundaries in ALF", Joint Video Experts Team (JVET) of ITU-T SG 16 WP 3 and ISO/IEC JTC 1/SC 29/WG 11, JVET-O0625, 15th Meeting: Gothenburg, SE, Jul. 3-12, 2019, pp. 1-4.

Bossen F., et al., "JVET Common Test Conditions and Software Reference Configurations for SDR video", Joint Video Experts Team (JVET) of ITU-T SG 16 WP 3 and ISO/IEC JTC 1/SC 29/WG 11, Document: JVET-M1010-V1, 13th Meeting: Marrakech, MA, Jan. 9-18, 2019, pp. 1-6.

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.

Bross B., et al., "Versatile Video Coding (Draft 6)", Joint Video Experts Team (JVET) of ITU-T SG 16 WP 3 and iso/IEC JTC 1/SC 29/WG 11, JVET-O2001-vE, Jul. 3-12, 2019, 455 pages.

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 400 pp.

(56) References Cited

OTHER PUBLICATIONS

Hanhart P., "JVET Common Test Conditions and Evaluation Procedures for 360° video", JVET-L1012, Joint Video Experts Team (JVET) of ITU-T SG 16 WP 3 and ISO/IEC JTC 1/SC 29/WG 11, JVET-L1012, 12th Meeting: Macau, CN, Oct. 3-12, 2018, pp. 1-7.

JVET: "VTM-4.0, Tags, JVET/VVCSoftware_VTM, GitLab", Frank Bossen, https://vcgit.hhi.fraunhofer.de/jvet/VVCSoftware_VTM/-/tags/VTM-4.0, Accessed Jun. 2020, pp. 1-2.

JVET: "VTM-5.0, Tags, JVET/VVCSoftware_VTM, GitLab", Frank Bossen, https://vcgit.hhi.fraunhofer.de/jvet/VVCSoftware_VTM/-/tags/VTM-5.0, Accessed Jul. 2019, pp. 1-3.

JVET: "VTM-6.0, Tags, JVET/VVCSoftware_VTM, GitLab", Frank Bossen, https://vcgit.hhi.fraunhofer.de/jvet/VVCSoftware_VTM/-/tags/VTM-6.0 , Accessed Oct. 2019, pp. 1-4.

Kotra A., et al., "CE5-2: Loop Filter line Buffer Reduction", JVET-N0180, Joint Video Experts Team (JVET) of ITU-T SG 16 WP 3 and ISO/IEC JTC 1/SC 29/WG 11, JVET-N0180, 14th Meeting: Geneva, CH, Mar. 19-27, 2019, pp. 1-9.

Liu H., "Crosscheck of JVET-N0152 (Non-CE9: On Motion Refinement Parameter Derivation in Bdof)", JVET-N0654, Joint Video Experts Team (JVET) of ITU-T SG 16 WP 3 and ISO/IEC JTC 1/SC 29/WG 11, JVET-N0654, 14th Meeting: Geneva, CH, Mar. 19-27, 2019, pp. 1-2.

Wien H., "Core Experiment Viewing Test Procedure and Results", JVET-N0835, Joint Video Experts Team (JVET) of ITU-T SG 16 WP 3 and ISO/IEC JTC 1/SC 29/WG 11, JVET-N0835, 14th Meeting: Geneva, CH, Mar. 19-27, 2019, p. 1.

International Preliminary Report on Patentability—PCT/US20201022132, the International Bureau of WIPO—Geneva, Switzerland, dated Sep. 23, 2021 9 pp.

Taiwan Search Report—TW109108071—TIPO—dated Sep. 12, 2023.

* cited by examiner

| D1 160A | | D1 160B | | D1 160C | | D1 160D | |
|---|---|---|---|---|---|---|---|
| | D1 160E | | D1 160F | | D1 160G | | D1 160H |
| D1 160I | | D1 162A | | D1 162B | | D1 160J | |
| | D1 160K | | D1 162C | | D1 162D | | D1 160L |
| D1 160M | | D1 162E | | D1 162F | | D1 160N | |
| | D1 160O | | D1 162G | | D1 162H | | D1 160P |
| D1 160Q | | D1 160R | | D1 160S | | D1 160T | |
| | D1 160U | | D1 160V | | D1 160W | | D1 160X |

BOUNDARY HANDLING FOR ADAPTIVE LOOP FILTERING

This application claims the benefit of U.S. Provisional Application No. 62/816,728, filed Mar. 11, 2019, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to filters for user in video coding. In particular, when performing adaptive loop filtering (ALF) for a block of samples that is near a boundary of a picture, a slice, a tile, or a tile group, not all samples that are used for performing ALF may be available. In one example, samples used for determining the gradient value of a sample near a boundary may not be available if those samples are outside the boundary. In another example, gradient values within a window around a block of samples that are used for determining gradients and/or other information for performing ALF for the block may not be available. This disclosure describes techniques for determining such gradients (or Laplacian values) for samples near a boundary and for determining gradient values within a window that are outside a boundary in ways that potentially improve the accuracy of the gradients, directionality, and the ALF that is performed for those samples, thereby potentially improving the subjective and/or objective quality of the filtered block of samples.

In one example, a method for coding video includes reconstructing a block of video data to create a reconstructed block of video data. The method further includes determining a value of a gradient for a sample in the reconstructed block of video data, including performing a gradient calculation for the sample using an available sample that corresponds to an unavailable sample that is outside of one of: a picture, a slice, a tile, or a tile group that includes the reconstructed block of samples. The method further includes determining an adaptive loop filter for the reconstructed block of video data based at least in part on the determined value of the gradient for the sample. The method further includes applying the determined adaptive loop filter to the reconstructed block of video data to generate a filtered block of video data.

In another example, an apparatus includes a memory configured to store a block of video data. The apparatus further includes one or more processors, implemented in circuitry, in communication with the memory, the one or more processors configured to: reconstruct the block of video data to create a reconstructed block of video data; determine a value of a gradient for a sample in the reconstructed block of video data, including performing a gradient calculation for the sample using an available sample that corresponds to an unavailable sample that is outside of one of: a picture, a slice, a tile, or a tile group that includes the reconstructed block of samples; determine an adaptive loop filter for the reconstructed block of video data based at least in part on the determined value of the gradient; and apply the determined adaptive loop filter to the reconstructed block of video data to generate a filtered block of video data.

In another example, an apparatus configured to code video data includes means for reconstructing a block of video data to create a reconstructed block of video data. The apparatus further includes means for determining a value of a gradient for a sample in the reconstructed block of video data, including performing a gradient calculation for the sample using an available sample that corresponds to an unavailable sample that is outside of one of: a picture, a slice, a tile, or a tile group that includes the reconstructed block of samples. The apparatus further includes means for determining an adaptive loop filter for the reconstructed block of video data based at least in part on the determined value of the gradient for the sample. The apparatus further includes means for applying the determined adaptive loop filter to the reconstructed block of video data to generate a filtered block of video data.

In another example, a computer-readable storage medium is encoded with instructions that, when executed, cause one or more processors configured to code data to: reconstruct a block of video data to create a reconstructed block of video data; determine a value of a gradient for a sample in the reconstructed block of video data, including performing a gradient calculation for the sample using an available sample that corresponds to an unavailable sample that is outside of one of: a picture, a slice, a tile, or a tile group that includes the reconstructed block of samples; determine an adaptive loop filter for the reconstructed block of video data based at least in part on the determined value of the gradient for the sample; and apply the determined adaptive loop filter to the reconstructed block of video data to generate a filtered block of video data.

The details of one or more examples are set forth in the accompanying drawings and the description below. Other features, objects, and advantages will be apparent from the description, drawings, and claims.

BRIEF DESCRIPTION OF DRAWINGS

FIGS. 4A-4H illustrate the calculation of gradient values for a block.

DETAILED DESCRIPTION

Figure 1:
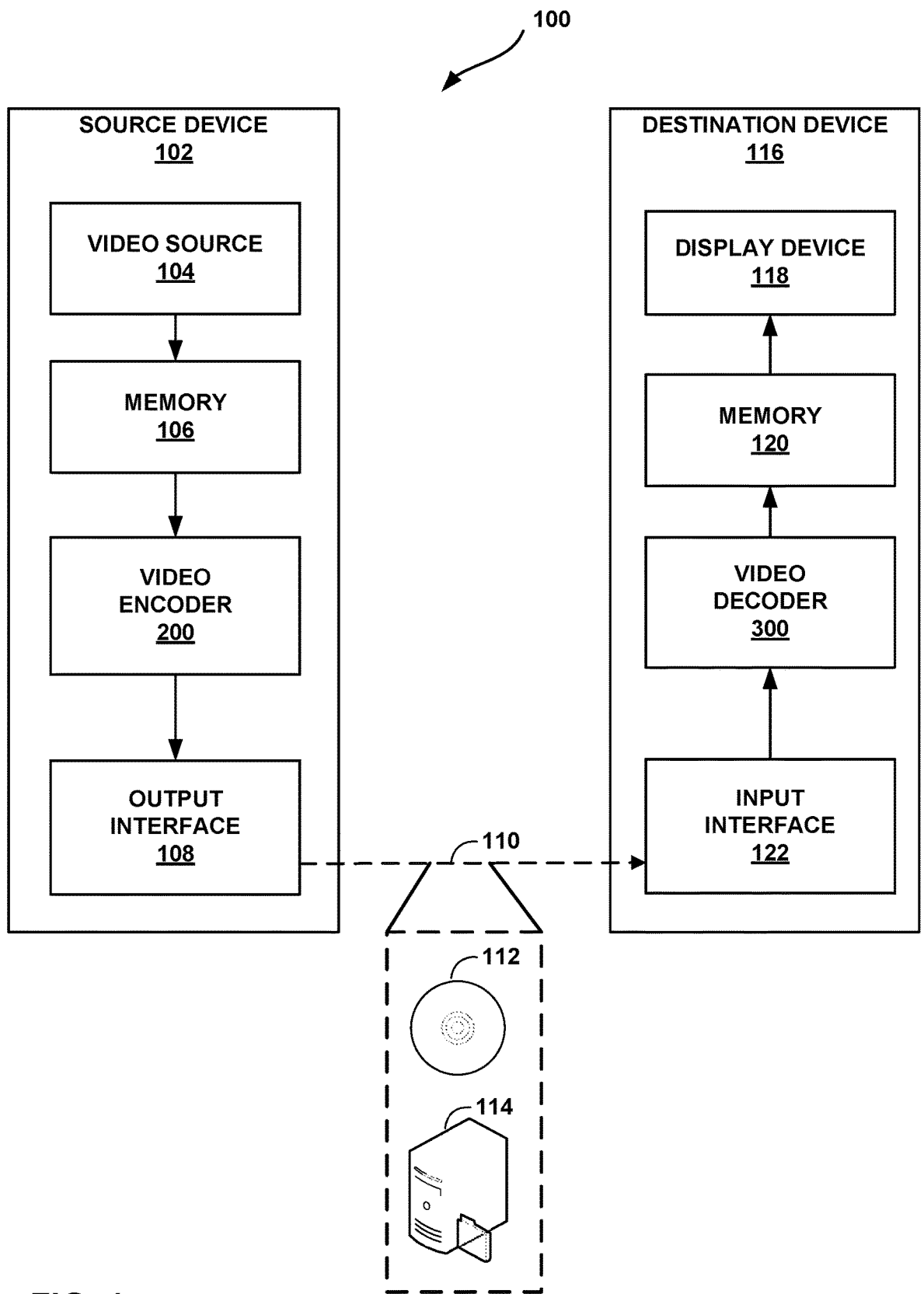
FIG. 1 is a block diagram illustrating an example video encoding and decoding system that may perform the techniques of this disclosure.

This disclosure describes techniques related to filtering operations which could be used in a post-processing stage, as part of in-loop coding, or in the prediction stage of video coding. The techniques of this disclosure may be implemented into existing video codecs, such as HEVC (High Efficiency Video Coding), or may be an efficient coding tool for a future video coding standard, such as the H.266 standard presently under development.

Video coding typically involves predicting a block of video data from either an already coded block of video data in the same picture (i.e. intra prediction) or an already coded block of video data in a different picture (i.e. inter prediction). In some instances, the video encoder also calculates a residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream. This disclosure describes techniques related to ALF. ALF may be used in a post-processing stage or for in-loop coding, or in a prediction process.

A video decoder may perform classification operations on samples in video data as part of performing ALF on the video data. To perform such classification operations on samples in the video data, a video decoder may perform various calculations for each of the samples in the video data, including calculating gradient values of samples in the video data based at least in part on neighboring samples. However, when a sample is on a boundary of picture, slice, tile, or tile group, one or more neighboring samples that are used for calculating gradient values for the sample may be unavailable because the one or more neighboring samples are outside the boundary of the picture, slice, tile, or tile group.

In one example, the video decoder may use techniques such as repetitive padding to replace neighboring samples that are outside the boundary of the picture, slice, tile, or tile group with the closest samples that are inside the boundary. However, those techniques may potentially introduce loss of subjective and/or objective quality. For example, repetitive padding may potentially introduce discontinuities into the reconstructed video data that may not have otherwise appeared had the actual sample values been used.

In accordance with aspects of the present disclosure, a video decoder may calculate gradient values for a sample on a boundary of picture, slice, tile, or tile group in ways that potentially improve the subjective and/or objective quality of the samples after filtering. In one example, a video decoder may calculate gradient values for a sample on a boundary of picture, slice, tile, or tile group by replacing one or more neighboring samples that are outside the boundary of the picture, slice, tile, or tile group with sample values of the one or more unavailable sample's nearest sample within the picture, slice, tile, or tiles group along the gradient direction. By replacing one or more neighboring samples that are outside the boundary of the picture, slice, tile, or tile group with sample values of the one or more unavailable sample's nearest sample within the picture, slice, tile, or tiles group along the gradient direction, the techniques described herein may improve the subjective and/or objective quality of the samples after filtering compared with techniques such as repetitive padding, thereby providing a technical solution to the potential technical problem described above.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, a video encoder typically performs video decoding as part of the processes of determining how to encode video data.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptive loop filtering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for adaptive loop filtering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (WET) of ITU-T SG 16 WP 3 and ISO/IEC JTC 1/SC 29/WG 11, 16th Meeting: Geneva, CH, 1-11 Oct. 2019, JVET-P2001-v9 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder and/or video decoder may be configured to reconstruct a block of video data to create a reconstructed block of video data, determine a value of a gradient for a sample in the reconstructed block of video data, including performing a gradient calculation for the sample using an available sample that corresponds to an unavailable sample that is outside of one of: a picture, a slice, a tile, or a tile group that includes the reconstructed block of samples, determine an adaptive loop filter for the reconstructed block of video data based at least in part on the determined value of the gradient for the sample, and apply the determined adaptive loop filter to the reconstructed block of video data to generate a filtered block of video data.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In the field of video coding, it is common to apply filtering (e.g., an adaptive loop filter) in order to enhance the quality of a reconstructed and/or decoded video signal. In the context of this disclosure, a reconstructed block of video data may refer to a block of video data that has been reconstructed in the reconstruction loop of video encoder 200, or may refer to a block of video data that is decoded by video decoder 300. In some examples, a filter may be applied as a post-filter, where the filtered frame is not used for prediction of future frames, or a filter may be applied as an in-loop filter, where the filtered frame is used to predict future frames. A filter can be designed, for example, by minimizing the error between the original signal and the reconstructed/decoded filtered signal. Similarly to transform coefficients, video encoder 200 may quantize code the coefficients of the filter $h(k,l)$, $k=-K, \ldots, K$, $l=-K, \ldots K$ by:

$$f(k,l) = \text{round}(\text{normFactor} \cdot h(k,l))$$

Video encoder 200 may send the coded quantized coefficients to video decoder 300. The normalization factor (normFactor) may be equal to $2^n$. The larger the value of normFactor, the more precise is the quantization and the quantized filter coefficients $f(k,l)$ provide better performance. However, larger values of normFactor produce coefficients $f(k,l)$ requiring more bits to transmit.

In video decoder 300, the decoded filter coefficients $f(k,l)$ are applied to the reconstructed image/block $R(i,j)$ as follows:

$$\tilde{R}(i,j) = \sum_{k=-K}^{K} \sum_{l=-K}^{K} f(k,l) R(i+k, j+l) / \sum_{k=-K}^{K} \sum_{l=-K}^{K} f(k,l), \quad (1)$$

where i and j are the coordinates of the samples within the frame or block.

Video encoder 200 and video decoder 300 may be configured to implement various ALF filtering techniques. Aspects of these filtering techniques (e.g., ALF) will now be described.

The in-loop ALF was evaluated during the HEVC development stage, but ALF was not included in the final version of the HEVC standard. However, the in-loop ALF has been adopted to VVC. Example details can be found in B. Bross, J. Chen, S. Liu, "JVET-L1001: Versatile Video Coding (Draft 3)", which is a simplified version of ALF described in M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-B0060, 2nd Meeting: San Diego, USA, 20 Feb.-26 Feb. 2016 and M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-O0038, 3$^{rd}$ Meeting: Geneva, CH, 26 May-1 Jun. 2016.

In VVC, for luma components in a picture, video encoder 200 and video decoder 300 may be configured to apply a 7×7 diamond shape filter for ALF. In VVC, for both chroma components (e.g., Cr and Cb) in a picture, video encoder 200 and video decoder 300 may be configured to apply a single set of ALF coefficients, such as a 5×5 diamond shape filter. In some examples, other filter shapes may also be used.

Video decoder 300 may be configured to filter each sample $\hat{I}_{i,j}$, resulting in sample value $I'_{i,j}$ as shown in equation (2), where L denotes filter length, $f_{m,n}$ represents filter coefficient, and o indicates a filter offset.

$$I'_{i,j}=(\Sigma_{m=-L}^{L}\Sigma_{n=-L}^{L}f_{m,n}\times\hat{I}_{i+m,j+n}+o)>>(BD_F-1), \quad (2)$$

where $(1<<(BD_F-1))=\Sigma_{m=-L}^{L}\Sigma_{n=-L}^{L}f(m,n)$ and $(o=(1<<(BD_F-2)))$ In VVC Test Model 3 (VTM3), the bit-depth, denoted by $BD_F$, was set to 8.

In VVC Test Model 5 (VTM5.0), clipping was introduced into ALF, and equation (2) was modified as shown in equation (2*)

$$I'_{i,j}=(\Sigma_{m=-L}^{L}\Sigma_{n=-L}^{L}[f_{m,n}*\min(\max(-c_{m,n},(\hat{I}_{i+m,j+n}-\hat{I}_{i,j})),c_{m,n})]+\hat{I}_{i,j}+o)>>(BD_F-1), \quad (2*)$$

where $c_{m,n}$ are the clipping parameters.

ALF was adopted in VVC draft 4. A detailed description of ALF classification can be found in U.S. patent application Ser. No. 16/427,017, filed May 30, 2019. In VVC, classification is performed for each 4×4 luma block using a subsampled gradient calculation, as described in "CE2: Subsampled Laplacian calculation (Test 6.1, 6.2, 6.3, and 6.4)," JVET-L0147, 12th Meeting: Macao, CN, 3-12 Oct. 2018. In addition, a 7-tap filter is applied to luma samples and a 5-tap filter is applied to chroma samples. In VVC draft 7, ALF uses seven (7) lines of buffer to store extra samples due to the dependency on deblocking filter and SAO along horizontal boundaries between CTUs. The detailed description of the use of line buffers can be found in JVET-M0164, and JVET-M0301.

To reduce or remove the number of lines to store sample from neighbor CTUs, some techniques have been developed, such as JVET-M0164, JVET-M0301, U.S. patent application Ser. No. 16/200,197, filed 26 Nov. 2018, and U.S. Pat. No. 9,641,866, issued 2 May 2017.

The techniques in "Adaptive loop filter with virtual boundary processing," JVET-M0164, 13th Meeting: Marrakech, MA, 9-18 Jan. 2019 (hereinafter JVET-M0164); "Non-CE: Loop filter line buffer reduction," JVET-M0301, 13th Meeting: Marrakech, MA, 9-18 Jan. 2019 (hereinafter JVET-M0301); U.S. patent application Ser. No. 16/200,197; and U.S. Pat. No. 9,641,866 only apply to horizontal boundaries between CTUs. In VVC draft 7, duplicated padding at boundaries of a picture, a slice, a tile, or a tile group is applied due to the unavailability of samples outside of the picture, slice, tile, or tile group.

Video encoder 200 and video decoder 300 may be configured to determine one of a plurality of classes of ALF to apply to a block of video data (e.g., a block of luma samples and/or chroma samples). When implementing VTM3, video encoder 200 and video decoder 300 are configured to apply classification to each 4×4 luma block. Video encoder 200 and video decoder 300 may be configured to classify each 4×4 block into one out of 25 classes based on a determined directionality and quantized value of activity for the block. The details are described in the following.

Video encoder 200 and video decoder 300 may be configured to determine the classification of an ALF for a block based on the 1D Laplacian direction of the samples of the block and a 2D Laplacian activity of the samples of the block for each 4×4 luma block. In one example, video encoder 200 and video decoder 300 may be configured to calculate the sum of gradients of every other sample within an 8×8 window that covers a 4×4 luma block to determine the gradient values of the block. Video encoder 200 and video decoder 300 may be configured to calculate four gradient values: a vertical gradient value denoted by $g_v$, a horizontal gradient value denoted by $g_h$, a 135-degree diagonal gradient value denoted by $g_{d1}$, and a 45 degree diagonal gradient value denoted by $g_{d2}$. Table 1 below shows potential directionality values that may be determined from the gradients and their physical meaning regarding the sample values of the block. For a 4×4 subblock with top-left coordinate (i,j), the gradient values $g_v, g_h, g_{d1}$ and $g_{d2}$ are defined as:

$$g_v = \sum_{k=i-2}^{i+5} \sum_{l=j-2}^{j+5} V_{k,l},$$

where $V_{k,l}=|2\hat{I}(k,l)-\hat{I}(k,l-1)-\hat{I}(k,l+1)|$, if both k and l are even numbers or both k and l are not even numbers; $V_{k,l}=0$, otherwise $$g_h = \sum_{k=i-2}^{i+5} \sum_{l=j-2}^{j+5} H_{k,l},$$

where $H_{k,l}=|2\hat{I}(k,l)-\hat{I}(k-1,l)-\hat{I}(k+1,l)|$, if both k and l are even numbers or both k and l are not even numbers; $H_{k,l}=0$, otherwise $$g_{d1} = \sum_{k=i-2}^{i+5} \sum_{l=j-2}^{j+5} D1_{k,l},$$

where $D1_{k,l}=|2\hat{I}(k,l)-\hat{I}(k-1,l-1)-\hat{I}(k+1,l+1)|$, if both k and l are even numbers or both k and l are not even numbers; $D1_{k,l}=0$, otherwise $$g_{d2} = \sum_{k=i-2}^{i+5} \sum_{l=j-2}^{j+5} D2_{k,l},$$

where $D2_{k,l} = |2\hat{I}(k,l) - \hat{I}(k-1,l+1) - \hat{I}(k+1,l-1)|$, if both k and l are even numbers or both k and l are not even numbers; $D2_{k,l} = 0$, otherwise.

TABLE 1

Values of Direction and Their Physical Meanings

| Direction values | physical meaning |
|---|---|
| 0 | Texture |
| 1 | Strong horizontal/vertical |
| 2 | horizontal/vertical |
| 3 | strong diagonal |
| 4 | diagonal |

To assign the directionality D, video encoder 200 and video decoder 300 may be configured to compare a ratio of maximum and minimum of the horizontal and vertical gradient values, denoted by $R_{h,v}$ in equation (3) below, and the ratio of maximum and minimum of two diagonal gradients, denoted by $R_{d1,d2}$ in equation (4), against each other with two thresholds $t_1$ and $t_2$.

$$R_{h,v} = g_{h,v}^{max} / g_{h,v}^{min} \quad (3)$$

where $g_{h,v}^{max} = \max(g_h, g_v)$, $g_{h,v}^{min} = \min(g_h, g_v)$, $$R_{d0,d1} = g_{d0,d1}^{max} / g_{d0,d1}^{min} \quad (4)$$

where $g_{d0,d1}^{max} = \max(g_{d0}, g_{d1})$, $g_{d0,d1}^{min} = \min(g_{d0}, g_{d1})$ By comparing the detected ratios of horizontal/vertical and diagonal gradients, video encoder 200 and video decoder 300 may determine five direction modes, i.e., D, within the range of [0, 4] inclusive, as defined in equation (5) below.

$$D = \begin{cases} 0 & R_{h,v} \le t_1 \ \&\& \ R_{d0,d1} \le t_1 \\ 1 & R_{h,v} > t_1 \ \&\& \ R_{h,v} > R_{d0,d1} \ \&\& \ R_{h,v} > t_2 \\ 2 & R_{h,v} > t_1 \ \&\& \ R_{h,v} > R_{d0,d1} \ \&\& \ R_{h,v} \le t_2 \\ 3 & R_{d0,d1} > t_1 \ \&\& \ R_{h,v} \le R_{d0,d1} \ \&\& \ R_{d0,d1} > t_2 \\ 4 & R_{d0,d1} > t_1 \ \&\& \ R_{h,v} \le R_{d0,d1} \ \&\& \ R_{d0,d1} \le t_2 \end{cases} \quad (5)$$

Video encoder 200 and video decoder 300 may calculate an activity value Act for the block as:

$$\text{Act} = \sum_{k=i-2}^{i+3} \sum_{l=j-2}^{j+3} (V_{k,l} + H_{k,l}). \quad (6)$$

Video encoder 200 and video decoder 300 may further quantize the activity value Act to the range of 0 to 4 inclusive, and the quantized value is denoted as A. This quantization process is detailed below.

An example quantization process is defined as follows:

avg_var=Clip_post(NUM_ENTRY-1,
(Act*ScaleFactor)>>shift);

$\hat{A}$=ActivityToIndex[avg_var], where NUM_ENTRY is set to 16, ScaleFactor is set to 24, shift is (3+internal coded-bitdepth), ActivityToIndex[NUM_ENTRY]={0, 1, 2, 2, 2, 2, 2, 3, 3, 3, 3, 3, 3, 3, 3, 4}, and function Clip_post(a,b) returns the smaller value between a and b.

Due to different ways of calculating the activity value, the ScaleFactor and ActivityToIndex may both be modified compared to the ALF design in JEM2.0.

In an example geometry transform based ALF (GALF) scheme, video encoder 200 and video decoder 300 may be configured to classify each N×N block into one of 25 classes (C) based on the directionality D of the block and quantized value of activity Â of the block as follows:

$$C = 5D + \hat{A}. \quad (7)$$

In one example, the value of Â is set to 0 . . . 4 for each column, which is derived from the variable Act. The smallest Act for a new value of Â is marked across the top row (e.g., 0, 8192, 16384, 57344, 122880). For example, Act with values within [16384, 57344-1] will fall in Â equal to 2.

For each classification, video encoder 200 may be configured to signal one set of filter coefficients. To better distinguish different directions of blocks marked with the same class index, four geometry transformations, including no transformation, diagonal, vertical flip and rotation, may be used. The formula forms of the three additional geometry transformations may be expressed as follows:

Diagonal: $f_D(k,l) = f(l,k)$,

Vertical flip: $f_V(k,l) = f(k,K-l-1)$,

Rotation: $f_R(k,l) = f(K-l-1,k)$, (8)

where K is the size of the filter, and $0 \le k, l \le K-1$ are coefficients coordinates, such that location (0,0) is at the upper left corner of the block and location (K-1, K-1) is at the lower right corner of the block. Note that when the diamond-shaped filter support is used, the coefficients with coordinates outside of the filter support may be set to 0. One technique for indicating the geometry transformation index is to derive the geometry transformation implicitly (e.g., without signaling) in order to avoid additional overhead. In some examples of GALF, the transformations are applied to the filter coefficients f(k,l) depending on gradient values calculated for that block. The relationship between the transformation and the four gradients is described in Table 2 below. In one or more examples, the transformations are based on which one of two gradients (horizontal and vertical, or 45-degree and 135-degree gradients) is larger. Based on the comparison, more accurate direction information can be extracted. Therefore, different filtering results could be obtained due to transformation while the overhead of filter coefficients is not increased.

TABLE 2

MAPPING OF GRADIENT AND TRANSFORMATIONS.

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

As discussed above, at the boundaries of a picture, a slice, a tile, or a tile group, including both horizontal boundaries as well as vertical boundaries, samples outside of such boundaries are unavailable for video encoder 200 and video decoder 300 to perform classification and filtering operations on samples along such boundaries for purposes of ALF.

A boundary of a picture may be the boundaries of a frame of video data while a boundary of a slice, a tile, or a tile group may be a boundary that separates portions of a single frame of video data, such as slices, tiles, and tile groups within the same frame of video data, and may also be referred to as a virtual boundary. In some examples, for the purposes of the present disclosure the boundaries discussed herein do not include a CTU boundary that is not also a slice/tile/tile group/picture boundary.

Figure 2:
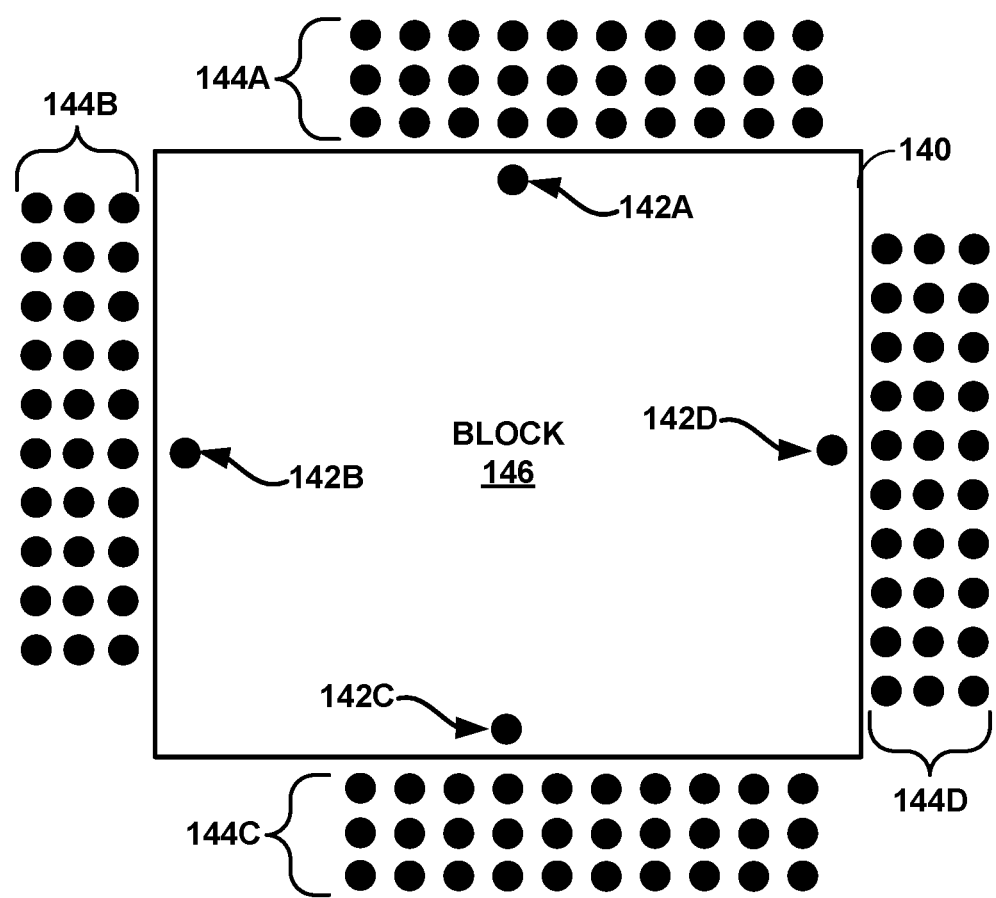
FIG. 2 illustrate examples of samples outside of a picture, a slice, a tile, or a tile group that are unavailable for performing classification and filtering operations for samples as part of performing adaptive loop filtering.

FIG. 2 illustrates examples of samples outside of a picture, a slice, a tile, or a tile group that are unavailable for performing classification and filtering operations for samples as part of performing adaptive loop filtering. As shown in FIG. 2, samples 142A-142D are inside boundaries 140 of block 146, where block 146 may be a picture, a slice, a tile, or a tiles group, and samples 143A-144D are outside of boundaries 140 of block 146. In particular, samples 142A-142D are said to be along boundaries 140 because samples 142A-142D are the samples at the edge of block 146, such that samples 142A-24D each neighbor a sample of samples 143A-144D that are outside of boundaries 140 of block 146.

In some examples, video encoder 200 and video decoder 300 may perform classification and filtering operations for samples 142A-142D of block 146 that require use of samples 143A-144D outside of boundaries 140 of block 146. For example, to calculate one or more gradient values for sample 142A along boundary 140, video encoder 200 and 300 may require one or more samples of samples 143A to perform the calculation of the one or more gradient values. However, because samples 143A-144D are outside of boundaries 140, samples 143A-144D may be unavailable for performing classification and filtering operations for samples 142A-142D.

As such, some techniques use the closest sample inside boundaries 140 of block 146 in place of a sample outside of boundaries 140 for performing classification and filtering operations for samples along boundaries 140, such as samples 142A-142D. One such technique is called repetitive padding and may be used at both the horizontal and vertical boundaries of boundaries 140. However, those techniques may potentially introduce loss of subjective and/or objective quality. For example, repetitive padding may potentially introduce discontinuities into the reconstructed video data that may not have otherwise appeared had the actual sample values been used.

Thus, instead of using techniques such as repetitive padding or other similar techniques, aspects of the disclosure describe techniques for determining gradients for samples 142A-142D that are along boundaries 140 of block 146 by replacing the sample values of one or more of samples 143A-144D outside of boundaries 140 of block 146 with sample values of samples within block 146 in ways that potentially improve the subjective and/or objective quality of the samples after filtering.

In some aspects, the techniques of this disclosure extend the techniques of JVET-M0164, NET-M0301, U.S. patent application Ser. No. 16/200,197, and U.S. Pat. No. 9,641,866 to horizontal and vertical boundaries of a picture, slice, tile, or tile group, such as the boundaries 140 of block 146. The described techniques can be applied individually or together in any combination.

In one example, video encoder 200 and video decoder 300 may perform gradient calculations as part of performing adaptive loop filtering. As discussed above, samples may be classified into one of twenty five (25) categories based on the total Laplacian activity and directionality of that block. In one example, in the calculation of gradient values, if a sample is out of the current picture/slice/tile/tile group, such as being outside of boundary 140, and therefore unavailable for the calculation of gradient values, video encoder 200 and video decoder 300 may use the sample value of the unavailable sample's nearest sample in the current picture, slice, tile, or tiles group, such as block 146, along the gradient direction in place of the sample value of the unavailable sample when performing gradient calculations.

Figure 3A:
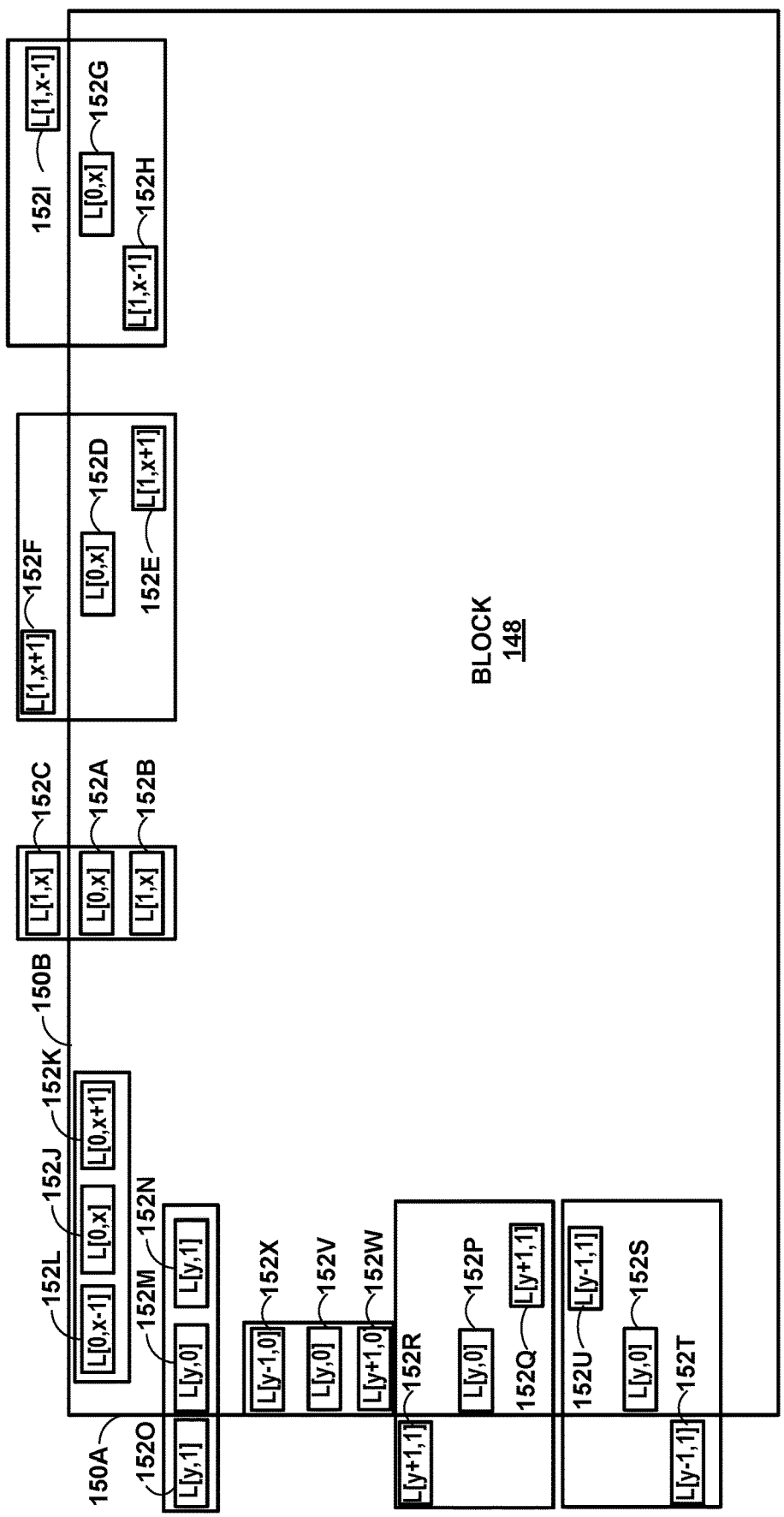
FIGS. 3A and 3B illustrate techniques for gradient calculation for adaptive loop filtering using unavailable samples.
Figure 3B:
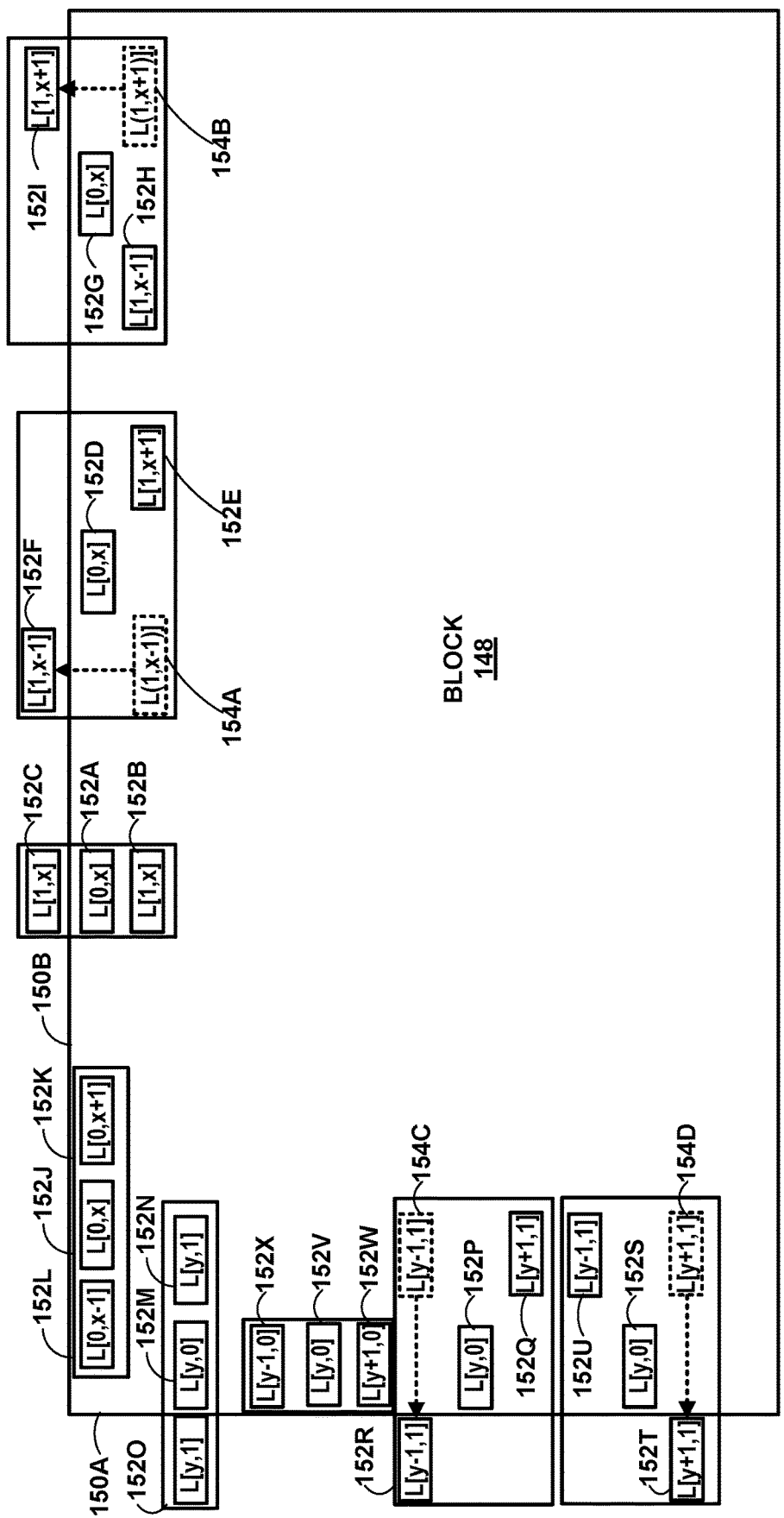

FIGS. 3A and 3B illustrate techniques for gradient calculation for adaptive loop filtering using unavailable samples. As part of performing adaptive loop filtering, video encoder 200 and video decoder 300 may perform classification and filtering operations based on calculating gradient values for samples.

As shown in FIG. 3A, block 148 may be a picture, a slice, a tile, a tiles group, and the like, where samples outside of the boundaries of block 148 may be unavailable to samples within block 148 for performing gradient calculations. Block 148 may be bounded by, for example, left boundary 150A, which may be a vertical boundary, and top boundary 150B, which may be a horizontal boundary. The term "boundary" is used in this disclosure to denote a boundary of a picture or a boundary between two portions of video data, where these portions may reside within the same video block or in different video blocks. Thus, the term "boundary" should not be construed as limited to a boundary separating two video blocks, but may also include virtual boundaries that may separate any two portions of video data. In some examples, the term boundary may not include CTU boundaries that are also not slice/tile/tile group/picture boundaries.

FIG. 3A shows an example for samples along top and left boundaries of picture/slice/tile/tile group. L[y,x] is the luma sample at y-th row and x-th column. Thus, in the example of FIG. 3A, the samples may be luma samples, and are shown to have coordinates in the form of L[y, x], where y is the vertical coordinate of the sample and x is the horizontal coordinate of the sample, where L[0,0] denotes the sample at the top-left corner of block 148. As such, samples along top boundary 150B may have y-coordinates of 0, while samples along left boundary 150A of block 148 may have x-coordinates of 0.

For samples within block 148 and are along the left boundary 150A and the top boundary 150B (e.g., samples having an x coordinate of 0 or samples having a y coordinate of 0, respectively, assuming that the top-left sample within boundary 150 has coordinates of (0, 0)), the video coder (e.g., video encoder 200 and video decoder 300) may calculate gradient values for a sample based on neighboring samples along the gradient direction to be calculated. For example, the video coder may calculate, for a sample within block 148, a horizontal direction gradient, a vertical direction gradient, a 45 degree diagonal direction gradient, and a 135 degree diagonal direction gradient.

In one example, video encoder 200 and video decoder 300 calculates values of the horizontal gradient, vertical gradient, and two diagonal gradients for a sample using 1-D Laplacian:

$$g_v = \sum_{k=i-M}^{i+N+M-1} \sum_{l=j-M}^{j+N+M-1} V_{k,l}, \text{ where} \quad (9)$$

$$V_{k,l} = |2R(k, l) - R(k, l-1) - R(k, l+1)|,$$

-continued $$g_h = \sum_{k=i-M}^{i+N+M-1} \sum_{l=j-M}^{j+N+M-1} H_{k,l}, \text{ where} \qquad (10)$$

$$H_{k,l} = |2R(k,l) - R(k-1,l) - R(k+1,l)|,$$

$$g_{d1} = \sum_{k=i-M}^{i+N+M-1} \sum_{l=j-M}^{j+N+M-1} D1_{k,l}, \text{ where} \qquad (11)$$

$$D1_{k,l} = |2R(k,l) - R(k-1,l-1) - R(k+1,l+1)|,$$

$$g_{d2} = \sum_{k=i-M}^{i+N+M-1} \sum_{j=j-M}^{j+N+M-1} D2_{k,l}, \text{ where} \qquad (12)$$

$$D2_{k,l} = |2R(k,l) - R(k-1,l+1) - R(k+1,l-1)|.$$

In these examples, $g_v$ represents a vertical gradient value, $g_h$ represents a horizontal gradient value, $g_{d1}$ represents a 135-degree diagonal gradient value, and $g_{d2}$ represents a 45-degree diagonal gradient value. Further, k, l are coefficients coordinates, and R(k,l) is the sample at coordinates (k,l) of a reconstructed block.

As can be seen, video encoder 200 and video decoder 300 can calculate a gradient value for a sample based at least in part on two neighboring samples of the sample in the same gradient direction as the gradient value being calculated. In particular, video encoder 200 and video decoder 300 may calculate the four directional gradient values for the center sample of three (3) consecutive neighboring samples. Thus, video encoder 200 and video decoder 300 may calculate a gradient value for a sample that is the center sample of three (3) consecutive neighboring samples along the gradient direction. However, a neighboring sample of a center sample in the three (3) consecutive neighboring samples may be unavailable for calculating the gradient value of the sample that is within block 148, such as if one of the neighboring samples in the same gradient direction is outside of top boundary 150B or outside of left boundary 150A of block 148, and therefore outside of a picture, a slice, a tile, or a tile group (e.g., block 148) bounded by top boundary 150B and/or left boundary 150A.

In accordance with aspects of the present disclosure, video encoder 200 and video decoder 300 may determine if a neighboring sample along the same gradient direction is unavailable for calculating a gradient value for a sample and, if so, may substitute an available neighboring sample along the same gradient direction for the unavailable sample. In particular, to calculate a gradient value for a sample that is the center sample of three (3) consecutive neighboring samples along the gradient direction, video encoder 200 and video decoder 300 may determine if one of the two non-center samples out of the three consecutive neighboring samples is unavailable and, if so, may replace the unavailable sample with the other non-center sample (i.e., the available neighboring sample) out of the three consecutive neighboring samples to calculate the gradient value for the center sample. Replacing the unavailable sample with the available neighboring sample includes replacing the sample value of the unavailable sample with the sample value of the available neighboring sample for the purposes of calculating the gradient value for the center sample.

For the purposes of calculating a gradient value, replacing an unavailable sample with the available neighboring sample may include calculating a gradient value using the sample value of the replacement sample in place of the sample value of the unavailable sample. As such, because the available neighboring sample is one of the three consecutive neighboring samples used to calculate a gradient value, the value of the available neighboring sample may be used twice when calculating the gradient value of the center sample of three consecutive neighboring samples to represent the two non-center samples in the three consecutive neighboring samples.

In the example of FIG. 3A, if a sample is above top boundary 150B of block 148, then the sample is unavailable for the purposes of determining gradient values for samples in block 148 that are along top boundary 150B. If video encoder 200 and video decoder 300 determines that one the three consecutive neighboring samples used to calculate a gradient value for a sample that borders top boundary 150B is above top boundary 150B, video encoder 200 and video decoder 300 may replace the sample that is outside of top boundary 150B with the other non-center sample of the three consecutive neighboring samples to calculate the gradient value for the sample that borders top boundary 150B.

For example, to calculate a vertical gradient value for sample 152A, video encoder 200 and video decoder 300 may take sample 152A at location L[0, x] as the center sample of three (3) consecutive samples along the vertical gradient direction. The other two samples of the three consecutive samples along the vertical direction with sample 152A as the center sample are the neighboring sample 152B at location L[1, x] that is immediately below sample 152A in the vertical gradient direction and the neighboring sample 152C at location L[-1, x] that is immediately above sample 152A in the vertical gradient direction.

However, as can be seen in FIG. 3A, neighboring sample 152C immediately above sample 152A at location L[-1, x] may be unavailable because neighboring sample 152C is outside of top boundary 150B of block 148. In accordance with aspects of the present disclosure, in response to determining that sample 152C is unavailable, video encoder 200 and video decoder 300 may replace the unavailable sample 152C with sample 152B, which is the other non-center sample of the three consecutive neighboring samples 152A-152C along the vertical gradient direction, to determine the vertical gradient value for sample 152A. As shown in FIG. 3A, sample 152C is replaced with the sample at location L[1, x], which is sample 152B.

In another example, to calculate a 45-degree diagonal gradient value for sample 152D, video encoder 200 and video decoder 300 may take sample 152D at location L[0, x] as the center sample of three (3) consecutive samples along the 45-degree diagonal gradient direction. The other two samples of the three consecutive samples along the 45-degree gradient direction with sample 152D as the center sample are the neighboring sample 152E at location L[1, x+1] that is immediately to the lower-right of sample 152D in the 45-degree diagonal gradient direction and the neighboring sample 152F at location L[-1, x-1] that is immediately to the upper-left of sample 152D in the 45-degree diagonal gradient direction.

However, as can be seen in FIG. 3A, neighboring sample 152F immediately to the upper-left of sample 152D at location L[-1, x-1] may be unavailable because it is outside of top boundary 150B of block 148. In accordance with aspects of the present disclosure, in response to determining that sample 152F is unavailable, video encoder 200 and video decoder 300 may replace the unavailable sample 152F with sample 152E, which is the other non-center sample of the three consecutive neighboring samples 152D-152F along the 45-degree diagonal gradient direction, to determine the 45-degree diagonal gradient value for sample 152D. As shown in FIG. 3A, sample 152F is replaced with the sample at location L[1, x+1], which is sample 152E.

In another example, to calculate a 135-degree diagonal gradient value for sample 152G, video encoder 200 and video decoder 300 may take sample 152G at location L[0, x] as the center sample of three (3) consecutive samples along the 135-degree diagonal gradient direction. The other two samples of the three consecutive samples along the 135-degree gradient direction with sample 152G as the center sample are the neighboring sample 152H at location L[1, x−1] that is immediately to the lower-left of sample 152G in the 135-degree diagonal gradient direction and the neighboring sample 152I at location L[−1, x+1] that is immediately to the upper-right of sample 152G in the 135-degree diagonal gradient direction.

However, as can be seen in FIG. 3A, neighboring sample 152I immediately to the upper-right of sample 152G at location L[−1, x+1] may be unavailable because it is outside of top boundary 150B of block 148. In accordance with aspects of the present disclosure, in response to determining that sample 152I is unavailable, video encoder 200 and video decoder 300 may replace the unavailable sample 152I with sample 152H, which is the other non-center sample of the three consecutive neighboring samples 152G-152I along the 135-degree diagonal gradient direction, to determine the 135-degree diagonal gradient value for sample 152G. As shown in FIG. 3A, sample 152I is replaced with the sample at location L[1, x−1], which is sample 152H.

In another example, to calculate a horizontal gradient value for sample 152J, video encoder 200 and video decoder 300 may take sample 152J at location L[0, x] as the center sample of three (3) consecutive samples along the horizontal gradient direction. The other two samples of the three consecutive samples along the horizontal direction with sample 152L as the center sample are the neighboring sample 152K at location L[0, x+1] that is immediately to the right of sample 152J in the horizontal gradient direction and the neighboring sample 152L at location L[0, x−1] that is immediately to the left of sample 152J in the horizontal gradient direction. Because samples 152J-152L are all inside of block 148 and not outside of left boundary 150A or top boundary 150B, video encoder 200 and video decoder 300 may not have to replace any of samples 152J-152L to calculate the horizontal gradient value for sample 152J.

Similarly, in the example of FIG. 3A, if a sample is to the left of left boundary 150A of block 148, then the sample is unavailable for the purposes of determining gradient values for samples in block 148 that are along left boundary 150A. If video encoder 200 and video decoder 300 determines that one the three consecutive neighboring samples used to calculate a gradient value for a sample that borders left boundary 150A is to the left of left boundary 150A, video encoder 200 and video decoder 300 may replace the sample that is outside of left boundary 150A with the other non-center sample of the three consecutive neighboring samples to calculate the gradient value for the sample that borders left boundary 150A.

For example, to calculate a horizontal gradient value for sample 152M, video encoder 200 and video decoder 300 may take sample 152M at location L[y, 0] as the center sample of three (3) consecutive samples along the horizontal gradient direction. The other two samples of the three consecutive samples along the horizontal direction with sample 150M as the center sample are the neighboring sample 152N at location L[y, 1] that is immediately to the right of sample 152M in the horizontal gradient direction and the neighboring sample 152O at location L[y, −1] that is immediately to the left of sample 152M in the horizontal gradient direction.

However, as can be seen in FIG. 3A, neighboring sample 152O immediately to the left of sample 152M at location L[y, −1] may be unavailable because it is outside of left boundary 150A of block 148. In accordance with aspects of the present disclosure, in response to determining that sample 152O is unavailable, video encoder 200 and video decoder 300 may replace the unavailable sample 152O with sample 152N, which is the other non-center sample of the three consecutive neighboring samples 152M-152O along the horizontal gradient direction, to determine the horizontal gradient value for sample 152M. As shown in FIG. 3A, sample 152O is replaced with the sample at location L[y, 1], which is sample 152N.

In another example, to calculate a 45-degree diagonal gradient value for sample 152P, video encoder 200 and video decoder 300 may take sample 152P at location L[y, 0] as the center sample of three (3) consecutive samples along the 45-degree diagonal gradient direction. The other two samples of the three consecutive samples along the 45-degree gradient direction with sample 152P as the center sample are the neighboring sample 152Q at location L[y+1, 1] that is immediately to the lower-right of sample 152P in the 45-degree diagonal gradient direction and the neighboring sample 152R at location L[y−1, −1] that is immediately to the upper-left of sample 152P in the 45-degree diagonal gradient direction.

However, as can be seen in FIG. 3A, neighboring sample 152R immediately to the upper-left of sample 152P at location L[y−1, −1] may be unavailable because it is outside of left boundary 150A of block 148. In accordance with aspects of the present disclosure, in response to determining that sample 152R is unavailable, video encoder 200 and video decoder 300 may replace the unavailable sample 152R with sample 152Q, which is the other non-center sample of the three consecutive neighboring samples 152P-152R along the 45-degree diagonal gradient direction, to determine the 45-degree diagonal gradient value for sample 152P. As shown in FIG. 3A, sample 152R is replaced with the sample at location L[y+1, 1], which is sample 152Q.

In another example, to calculate a 135-degree diagonal gradient value for sample 152S, video encoder 200 and video decoder 300 may take sample 152S at location L[y, 0] as the center sample of three (3) consecutive samples along the 135-degree diagonal gradient direction. The other two samples of the three consecutive samples along the 135-degree gradient direction with sample 152S as the center sample are the neighboring sample 152U at location L[y−1, 1] that is immediately to the upper-right of sample 152S in the 135-degree diagonal gradient direction and the neighboring sample 152T at location L[y+1, −1] that is immediately to the lower left of sample 152S in the 135-degree diagonal gradient direction.

However, as can be seen in FIG. 3A, neighboring sample 152T immediately to the lower-left of sample 152S at location L[y+1, −1] may be unavailable because it is outside of left boundary 150A of block 148. In accordance with aspects of the present disclosure, in response to determining that sample 152T is unavailable, video encoder 200 and video decoder 300 may replace the unavailable sample 152T with sample 152U, which is the other non-center sample of the three consecutive neighboring samples 152S-152U along the 135-degree diagonal gradient direction, to determine the 135-degree diagonal gradient value for sample 152S. As shown in FIG. 3A, sample 152T is replaced with the sample at location L[y−1, 1], which is sample 152U.

In another example, to calculate a vertical gradient value for sample 152J, video encoder 200 and video decoder 300 may take sample 152V at location L[y, 0] as the center sample of three (3) consecutive samples along the vertical gradient direction. The other two samples of the three consecutive samples along the vertical direction with sample 152V as the center sample are the neighboring sample 152W at location L[y+1, 0] that is immediately to the bottom of sample 152V in the vertical gradient direction and the neighboring sample 152X at location L[y−1, 0] that is immediately to the top of sample 152V in the vertical gradient direction. Because samples 152V-152X are all inside of block 148 and not outside of left boundary 150A or top boundary 150B, video encoder 200 and video decoder 300 may not have to replace any of samples 152V-152X to calculate the vertical gradient value for sample 152V.

In accordance with some aspects of the present disclosure, instead of replacing unavailable samples that are outside the boundaries, such as outside of left boundary 150A or top boundary 150B, with samples in the same gradient direction, video encoder 200 and video decoder 300 may, for the purposes of calculating gradient values of samples, use mirror padding to replace sample values of unavailable samples that are outside the boundaries with sample values of available neighboring samples. Mirror padding may refer to a process whereby video encoder 200 and video decoder 300 mirrors sample values near a current boundary of a block in place of, i.e., to take the place of, actual sample values of an unavailable sample.

If the unavailable sample borders a horizontal boundary, such as top boundary 150B, video encoder 200 and video decoder 300 may perform mirror padding to replace the sample value of the unavailable sample with the sample value of a sample on the same column as the unavailable sample and that is inside the horizontal boundary. In particular, video encoder 200 and video decoder 300 may determine a vertical distance of the unavailable sample from a sample on the same column that borders the horizontal boundary. Video encoder 200 and video decoder 300 may determine an available sample on the same column as the unavailable sample that is an equal vertical distance from the sample on the same column that borders the horizontal boundary but in the opposite direction from the sample on the same column that borders the horizontal boundary. Video encoder 200 and video decoder 300 may replace sample values of the unavailable sample with the sample values of the available sample on the same column that is an equal vertical distance as the unavailable sample in the other direction from the sample on the same column that borders the horizontal boundary.

In the example of FIG. 3B, in the coordinate system L[y, x], given a sample at L[−1, 4] that is outside of top boundary 150B and thus unavailable, video encoder 200 and video decoder 300 may determine the vertical distance between the unavailable sample and a sample on the same column that borders the top boundary 150B at L[0, 4] as a vertical distance of one. Video encoder 200 and video decoder 300 may determine that the sample at L[1, 4] is a sample that is on the same column that is an equal vertical distance in the other direction from the sample at L[0,4] and may replace the sample values of the unavailable sample at L[−1, 4] with the sample values of the sample at L[1, 4], thereby performing mirror padding for the unavailable sample at L[−1, 4].

For example, to calculate a vertical gradient value for sample 152A, video encoder 200 and video decoder 300 may take sample 152A at location L[0, x] as the center sample of three (3) consecutive samples along the vertical gradient direction. The other two samples of the three consecutive samples along the vertical direction with sample 152A as the center sample are the neighboring sample 152B at location L[1, x] that is immediately below sample 152A in the vertical gradient direction and the neighboring sample 152C at location L[−1, x] that is immediately above sample 152A in the vertical gradient direction.

However, as can be seen in FIG. 3B, neighboring sample 152C immediately above sample 152A at location L[−1, x] may be unavailable because it is outside of top boundary 150B of block 148. In accordance with aspects of the present disclosure, in response to determining that sample 152C is unavailable, video encoder 200 and video decoder 300 may perform mirror padding to replace the unavailable sample 152C. In particular, video encoder 200 and video decoder 300 may determine that sample 152B at location L[−1, x] is the sample inside top boundary 150B that is on the same column as the unavailable sample 152B and that is an equal vertical distance as the unavailable sample 152C in the other direction from the sample 152A at location L[0, x] on the same column that borders top boundary 150B. As such, sample 152C is replaced with the sample at location L[1, x], which is sample 152B.

In another example, to calculate a 45-degree diagonal gradient value for sample 152D, video encoder 200 and video decoder 300 may take sample 152D at location L[0, x] as the center sample of three (3) consecutive samples along the 45-degree diagonal gradient direction. The other two samples of the three consecutive samples along the 45-degree gradient direction with sample 152D as the center sample are the neighboring sample 152E at location L[1, x+1] that is immediately to the lower-right of sample 152D in the 45-degree diagonal gradient direction and the neighboring sample 152F at location L[−1, x−1] that is immediately to the upper-left of sample 152D in the 45-degree diagonal gradient direction.

However, as can be seen in FIG. 3B, neighboring sample 152F immediately to the upper-left of sample 152D at location L[−1, x−1] may be unavailable because it is outside of top boundary 150B of block 148. In accordance with aspects of the present disclosure, in response to determining that sample 152F is unavailable, video encoder 200 and video decoder 300 may perform mirror padding replace the unavailable sample 152F. In particular, video encoder 200 and video decoder 300 may determine that sample 153A at location L[1, x−1] is the sample inside top boundary 150B that is on the same column as the unavailable sample 152F and that is an equal vertical distance as the unavailable sample 152F in the other direction from the sample at location L[0, x−1] on the same column that borders top boundary 150B. As such, sample 152F is replaced with the sample at location L[1, x−1], which is sample 153A.

In another example, to calculate a 135-degree diagonal gradient value for sample 152G, video encoder 200 and video decoder 300 may take sample 152G at location L[0, x] as the center sample of three (3) consecutive samples along the 135-degree diagonal gradient direction. The other two samples of the three consecutive samples along the 135-degree gradient direction with sample 152G as the center sample are the neighboring sample 152H at location L[1, x−1] that is immediately to the lower-left of sample 152G in the 135-degree diagonal gradient direction and the neighboring sample 152I at location L[−1, x+1] that is immediately to the upper-right of sample 152G in the 135-degree diagonal gradient direction.

However, as can be seen in FIG. 3B, neighboring sample 152I immediately to the upper-right of sample 152G at location L[−1, x+1] may be unavailable because it is outside of top boundary 150B of block 148. In accordance with aspects of the present disclosure, in response to determining that sample 152I is unavailable, video encoder 200 and video decoder 300 may perform mirror padding to replace the unavailable sample 152I. In particular, video encoder 200 and video decoder 300 may determine that sample 153B at location L[1, x+1] is the sample inside top boundary 150B that is on the same column as the unavailable sample 152I and that is an equal vertical distance as the unavailable sample 152I in the other direction from the sample at location L[0, x+1] on the same column that borders top boundary 150B. As such, sample 152I is replaced with the sample at location L[1, x+1], which is sample 153B.

In another example, to calculate a horizontal gradient value for sample 152I, video encoder 200 and video decoder 300 may take sample 152I at location L[0, x] as the center sample of three (3) consecutive samples along the horizontal gradient direction. The other two samples of the three consecutive samples along the horizontal direction with sample 152L as the center sample are the neighboring sample 152K at location L[0, x+1] that is immediately to the right of sample 152I in the horizontal gradient direction and the neighboring sample 152L at location L[0, x−1] that is immediately to the left of sample 152I in the horizontal gradient direction. Because samples 152I-152L are all inside of block 148 and not outside of left boundary 150A or top boundary 150B, video encoder 200 and video decoder 300 may not have to replace any of samples 152I-152L to calculate the horizontal gradient value for sample 152J.

Similarly, if the unavailable sample borders a vertical boundary, such as left boundary 150A, video encoder 200 and video decoder 300 may perform mirror padding to replace the sample value of the unavailable sample with the sample value of a sample on the same row as the unavailable sample and that is inside the vertical boundary. In particular, video encoder 200 and video decoder 300 may determine a horizontal distance of the unavailable sample from a sample on the same row that borders the vertical boundary. Video encoder 200 and video decoder 300 may determine a sample on the same row as the unavailable sample that is an equal horizontal distance from the sample on the same row that borders the vertical boundary but in the opposite direction from the sample on the same row that borders the vertical boundary. Video encoder 200 and video decoder 300 may replace the unavailable sample with the sample values of an available sample on the same row that is an equal horizontal distance as the unavailable sample in the other direction from the sample on the same column that borders the vertical boundary in the other direction.

In the example of FIG. 3B, in the coordinate system L[y, x], given a sample at L[y, −1] that is outside of left boundary 150A and thus unavailable, video encoder 200 and video decoder 300 may determine the horizontal distance between the unavailable sample and a sample on the same row that borders the left boundary 150A at L[y, 0] as a horizontal distance of one. Video encoder 200 and video decoder 300 may determine that the sample at L[y, 1] is a sample that is on the same row that is an equal horizontal distance in the other direction from the sample at L[y,0] and may replace the sample values of the unavailable sample at L[y, −1] with the sample values of the sample at L[y, 1], thereby performing mirror padding for the unavailable sample at L[y, −1].

For example, to calculate a horizontal gradient value for sample 152M, video encoder 200 and video decoder 300 may take sample 152M at location L[y, 0] as the center sample of three (3) consecutive samples along the horizontal gradient direction. The other two samples of the three consecutive samples along the horizontal direction with sample 150M as the center sample are the neighboring sample 152N at location L[y, 1] that is immediately to the right of sample 152M in the horizontal gradient direction and the neighboring sample 152O at location L[y, −1] that is immediately to the left of sample 152M in the horizontal gradient direction.

However, as can be seen in FIG. 3B, neighboring sample 152O immediately to the left of sample 152M at location L[y, −1] may be unavailable because it is outside of left boundary 150A of block 148. In accordance with aspects of the present disclosure, in response to determining that sample 152O is unavailable, video encoder 200 and video decoder 300 may perform mirror padding to replace the unavailable sample 152O. In particular, video encoder 200 and video decoder 300 may determine that sample 152N at location L[y, 1] is the sample inside left boundary 150A that is on the same row as the unavailable sample 152O and that is an equal vertical distance as the unavailable sample 152I in the other direction from the sample at location L[y, 0] on the same row that borders left boundary 150A. As such, sample 152O is replaced with the sample at location L[y, 1], which is sample 152N.

In another example, to calculate a 45-degree diagonal gradient value for sample 152P, video encoder 200 and video decoder 300 may take sample 152P at location L[y, 0] as the center sample of three (3) consecutive samples along the 45-degree diagonal gradient direction. The other two samples of the three consecutive samples along the 45-degree gradient direction with sample 152P as the center sample are the neighboring sample 152Q at location L[y+1, 1] that is immediately to the lower-right of sample 152P in the 45-degree diagonal gradient direction and the neighboring sample 152R at location L[y−1, −1] that is immediately to the upper-left of sample 152P in the 45-degree diagonal gradient direction.

However, as can be seen in FIG. 3B, neighboring sample 152R immediately to the upper-left of sample 152P at location L[y−1, −1] may be unavailable because it is outside of left boundary 150A of block 148. In accordance with aspects of the present disclosure, in response to determining that sample 152R is unavailable, video encoder 200 and video decoder 300 may perform mirror padding to replace the unavailable sample 152R. In particular, video encoder 200 and video decoder 300 may determine that sample 154C at location L[y−1, 1] is the sample inside left boundary 150A that is on the same row as the unavailable sample 152R and that is an equal vertical distance as the unavailable sample 152R in the other direction from the sample at location L[y−1, 0] on the same row that borders left boundary 150A. As such, sample 152R is replaced with the sample at location L[y−1, 1], which is sample 154C.

In another example, to calculate a 135-degree diagonal gradient value for sample 152S, video encoder 200 and video decoder 300 may take sample 152S at location L[y, 0] as the center sample of three (3) consecutive samples along the 135-degree diagonal gradient direction. The other two samples of the three consecutive samples along the 135-degree gradient direction with sample 152S as the center sample are the neighboring sample 152U at location L[y−1, 1] that is immediately to the upper-right of sample 152S in the 135-degree diagonal gradient direction and the neighboring sample 152T at location L[y+1, −1] that is immediately to the lower left of sample 152S in the 135-degree diagonal gradient direction.

However, as can be seen in FIG. 3B, neighboring sample 152T immediately to the lower-left of sample 152S at location L[y+1, −1] may be unavailable because it is outside of left boundary 150A of block 148. In accordance with aspects of the present disclosure, in response to determining that sample 152T is unavailable, video encoder 200 and video decoder 300 may perform mirror padding to replace the unavailable sample 152T. In particular, video encoder 200 and video decoder 300 may determine that sample 154D at location L[y+1, 1] is the sample inside left boundary 150A that is on the same row as the unavailable sample 152T and that is an equal vertical distance as the unavailable sample 152T in the other direction from the sample at location L[y+1, 0] on the same row that borders left boundary 150A. As such, sample 152T is replaced with the sample at location L[y+1, 1], which is sample 154D.

In another example, to calculate a vertical gradient value for sample 152J, video encoder 200 and video decoder 300 may take sample 152V at location L[y, 0] as the center sample of three (3) consecutive samples along the vertical gradient direction. The other two samples of the three consecutive samples along the vertical direction with sample 152V as the center sample are the neighboring sample 152W at location L[y+1, 0] that is immediately to the bottom of sample 152V in the vertical gradient direction and the neighboring sample 152X at location L[y−1, 0] that is immediately to the top of sample 152V in the vertical gradient direction. Because samples 152V-152X are all inside of block 148 and not outside of left boundary 150A or top boundary 150B, video encoder 200 and video decoder 300 may not have to replace any of samples 152V-152X to calculate the vertical gradient value for sample 152V.

In some examples, as described above, to perform ALF, video encoder 200 and video decoder 300 may determine a classification for samples based at least in part on the gradient values for the samples, such as determined using the techniques described in FIGS. 3A and 3B. In particular, video encoder 200 and video decoder 300 may be configured to determine one of a plurality of classes of ALF to apply to a block of video data (e.g., a block of luma samples and/or chroma samples) based on gradient values. In some examples, video encoder 200 and video decoder 300 is configured to apply classification to each 4×4 luma block. Video encoder 200 and video decoder 300 may be configured to classify each 4×4 block into one out of 25 classes based on a determined directionality and quantized value of activity for the block in order to select an adaptive loop filter for each block. The details are described as follows.

Video encoder 200 and video decoder 300 may be configured to determine the classification of an ALF for a block based on the 1D Laplacian direction of the samples of the block and a 2D Laplacian activity of the samples of the block for each 4×4 luma block. In one example, video encoder 200 and video decoder 300 may be configured to calculate the sum of gradients of every other sample within an 8×8 window that covers a 4×4 luma block to determine the gradient values of the block. Video encoder 200 and video decoder 300 may be configured to calculate four gradient values: a vertical gradient value denoted by $g_v$, a horizontal gradient value denoted by $g_h$, a 135-degree diagonal gradient value denoted by $g_{d1}$, and a 45 degree diagonal gradient value denoted by $g_{d2}$.

As shown in FIG. 4A, video encoder 200 and video decoder 300 may calculate a gradient value (represented in FIG. 4A as "D1") for samples in the 8×8 region. Calculating gradient values for a sample may include calculating values for each of a vertical gradient, a horizontal gradient, a 45-degree diagonal gradient, and a 135-degree diagonal gradient for the same.

In some examples, video encoder and video decoder 300 may calculate gradient values for all samples in the 8×8 region or for fewer than all samples in the 8×8 region. For example, to calculate gradient values for fewer than all samples in the 8×8 region, video encoder 200 and video decoder 300 may calculate a gradient value for every other sample in the 8×8 region, as shown in FIG. 4A, instead of for every sample in the 8×8 region. Determining a gradient value for fewer than all of the samples (e.g., for every other sample) in the 8×8 region, as opposed to determining a gradient value for every sample in the 8×8 region may, in some examples, be referred to as "subsampling" and the gradient values determined for fewer than all of the samples in the 8×8 region may be referred to as "subsampled gradients."

In the current VVC, a 4×4 block, such as block 170, illustrated as being shaded in FIG. 4A, accumulates subsampled gradients in the 8×8 surrounding window, such as region 172. The portions of region 172 outside of block 170 are illustrated as not being shaded in FIG. 4A. In one example, video encoder 200 and video decoder 300 determines the activity of block 170 as the sum of the vertical and horizontal gradients over region 172. Video encoder 200 and video decoder 300 quantizes this value to yield five activity values. Further, video encoder 200 and video decoder 300 determines the dominant gradient direction within block 170 by comparing the directional gradients and additionally the direction strength is determined, which give five direction values. Both features together result in 25 classes.

However, portions of region 172 outside of block 170 may also be beyond a horizontal boundary or a vertical boundary of block 170 and thus the gradients outside of the horizontal boundary or the vertical boundary of block 170 may be unavailable for determining the sums of gradients over region 172. For example, portions of region 172 outside of block 170 that are on the other side of a horizontal boundary or a vertical boundary from block 170 are beyond the horizontal boundary or the vertical boundary. Examples of horizontal boundaries and vertical boundaries may include a picture boundary, a slice boundary, a tile boundary, a tile group boundary, and the like, as discussed throughout this disclosure. As such, aspects of the present disclosure are applicable to non-CTU boundaries, such as a picture boundary (i.e., the boundary of a frame of video data) or a virtual boundary.

One technique for potentially overcoming this issue involves using padded samples for determining gradients for samples that are unavailable. For example, for current sample A in block 170, if video encoder 200 and video decoder 300 need a sample B that is on the other side of a horizontal or vertical boundary relative to sample A, video encoder 200 and video decoder 300 may replace the value of sample B with sample B's nearest sample on sample A's side within block 170. Such replaced samples may be referred to as padded samples. However, these techniques may potentially introduce loss of subjective and/or objective quality. For example, padding may potentially introduce discontinuities into the reconstructed video data that may not have otherwise appeared had the actual sample values been used.

In accordance with aspects of the present disclosure, instead of using padded samples to replace gradients that are outside the boundaries of a picture, a slice, a tile, or a tile group, those gradients are replaced with the gradient inside the boundaries of the picture, the slice, the tile, or the tile group. In some examples, gradients that are outside of a boundary may be replaced with gradients that are within a boundary, even if the gradients within the boundary are outside of the 4×4 block 170.

Figure 4B:
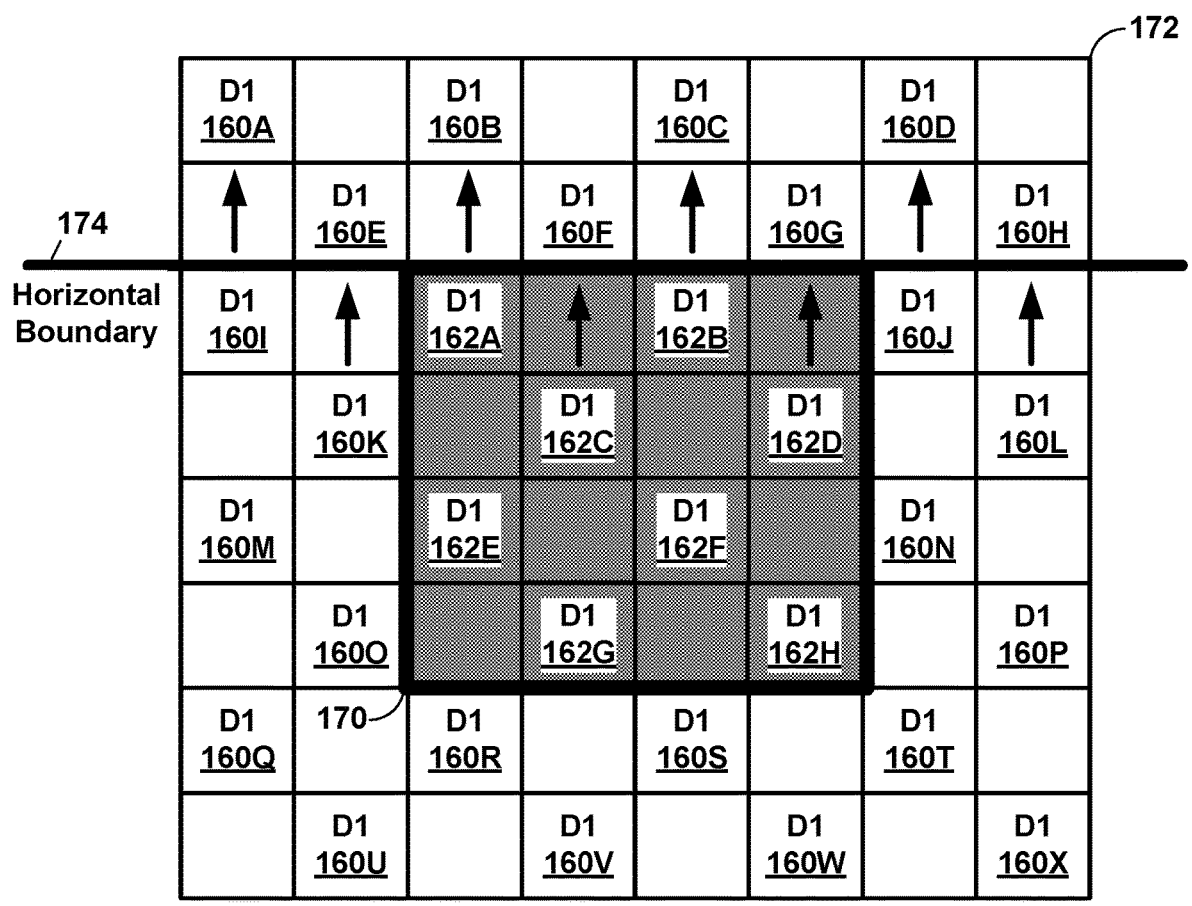

As shown in FIG. 4B, if a gradient is out of horizontal boundary 174 of a picture, a slice, a tile, or a tile group, the nearest gradient on the same column of a picture, a slice, a tile, or a tile group is used. In particular, samples 160A-160H are outside of horizontal boundary 174 because samples 160A-160H are on the other side of horizontal boundary 174 from block 170. As such, the gradients for samples 160A-160H are unavailable for classifying block 170 based at least in part on accumulating subsampled gradients in the 8×8 surrounding region 172 of block 170.

In accordance with aspects of the present disclosure, video encoder 200 and video decoder 300 may replace gradients in region 172 that are outside of horizontal boundary 174 with the nearest gradient in the same column in region 172 that are within horizontal boundary 174 (i.e., on the same side of horizontal boundary 174 as block 170). Thus, in the example of FIG. 4B, video encoder 200 and video decoder 300 may replace the gradient for sample 160A that is outside of horizontal boundary 174 with the gradient for sample 160I that is inside horizontal boundary 174, as denoted by the arrow pointing from sample 160I to sample 160A. Video encoder 200 and video decoder 300 may replace the gradient for sample 160E that is outside of horizontal boundary 174 with the gradient for sample 160K that is inside horizontal boundary 174, as denoted by the arrow pointing from sample 160K to sample 160E.

Video encoder 200 and video decoder 300 may replace the gradient for sample 160B that is outside of horizontal boundary 174 with the gradient for sample 162A that is inside horizontal boundary 174, as denoted by the arrow pointing from sample 162A to sample 160B. Video encoder 200 and video decoder 300 may also replace the gradient for sample 160F that is outside of horizontal boundary 174 with the gradient for sample 162C that is inside horizontal boundary 174, as denoted by the arrow pointing from sample 162C to sample 160F. Video encoder 200 and video decoder 300 may also replace the gradient for sample 160C that is outside of horizontal boundary 174 with the gradient for sample 162B that is inside horizontal boundary 174, as denoted by the arrow pointing from sample 162B to sample 160C. Video encoder 200 and video decoder 300 may also replace the gradient for sample 160G that is outside of horizontal boundary 174 with the gradient for sample 162D that is inside horizontal boundary 174, as denoted by the arrow pointing from sample 162D to sample 160G.

Video encoder 200 and video decoder 300 may also replace the gradient for sample 160D that is outside of horizontal boundary 174 with the gradient for sample 160J that is inside horizontal boundary 174, as denoted by the arrow pointing from sample 160J to sample 160D. Video encoder 200 and video decoder 300 may also replace the gradient for sample 160H that is outside of horizontal boundary 174 with the gradient for sample 160L that is inside horizontal boundary 174, as denoted by the arrow pointing from sample 160L to sample 160H.

Figure 4C:
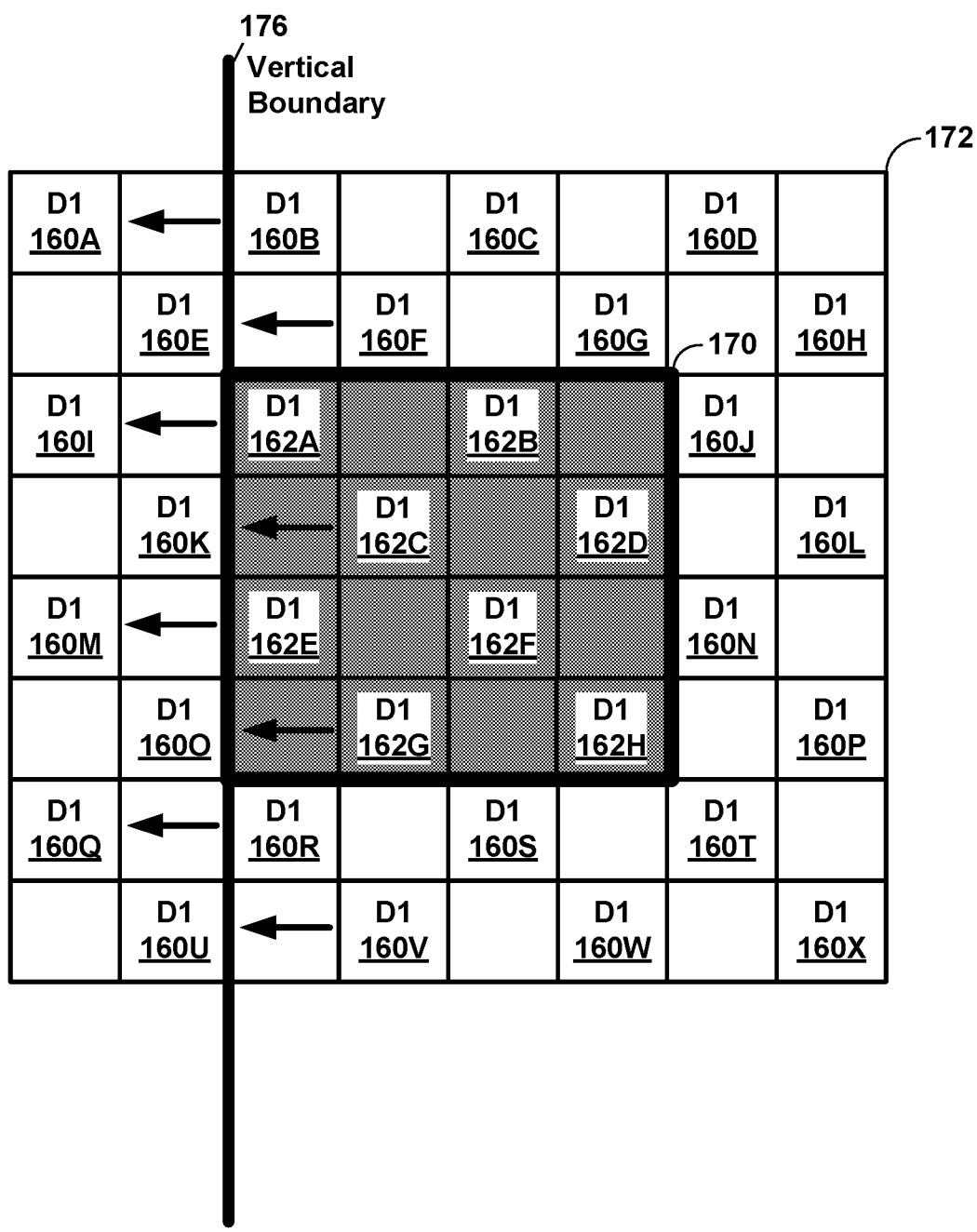

As shown in FIG. 4C, if a gradient is out of vertical boundary 176, the nearest gradient on the same row in the picture, slice, tile, or tile group bounded by vertical boundary 176 is used. In particular, sample 160A, sample 160E, sample 160I, sample 160K, sample 160M, sample 160O, sample 160Q, and sample 160U are outside of vertical boundary 176 because sample 160A, sample 160E, sample 160I, sample 160K, sample 160M, sample 160O, sample 160Q, and sample 160U are on the other side of vertical boundary 176 from block 170. As such, the gradients for sample 160A, sample 160E, sample 160I, sample 160K, sample 160M, sample 160O, sample 160Q, and sample 160U are unavailable for classifying block 170 based at least in part on accumulating subsampled gradients in the 8×8 surrounding region 172 of block 170.

In accordance with aspects of the present disclosure, video encoder 200 and video decoder 300 may replace gradients in region 172 that are outside of vertical boundary 176 with the nearest gradient in the same row in region 172 that are within vertical boundary 176 (i.e., on the same side of vertical boundary 176 as block 170). Thus, in the example of FIG. 4C, video encoder 200 and video decoder 300 may replace the gradient for sample 160A that is outside of vertical boundary 176 with the gradient for sample 160B that is inside vertical boundary 176, as denoted by the arrow pointing from sample 160B to sample 160A. Video encoder 200 and video decoder 300 may replace the gradient for sample 160E that is outside of vertical boundary 176 with the gradient for sample 160F that is inside vertical boundary 176, as denoted by the arrow pointing from sample 160F to sample 160E.

Video encoder 200 and video decoder 300 may replace the gradient for sample 160I that is outside of vertical boundary 176 with the gradient for sample 162A that is inside vertical boundary 176, as denoted by the arrow pointing from sample 162A to sample 160I. Video encoder 200 and video decoder 300 may also replace the gradient for sample 160K that is outside of vertical boundary 176 with the gradient for sample 162C that is inside vertical boundary 176, as denoted by the arrow pointing from sample 162C to sample 160K. Video encoder 200 and video decoder 300 may also replace the gradient for sample 160M that is outside of vertical boundary 176 with the gradient for sample 162E that is inside vertical boundary 176, as denoted by the arrow pointing from sample 162E to sample 160M. Video encoder 200 and video decoder 300 may also replace the gradient for sample 160O that is outside of vertical boundary 176 with the gradient for sample 162G that is inside vertical boundary 176, as denoted by the arrow pointing from sample 162G to sample 160O.

Video encoder 200 and video decoder 300 may also replace the gradient for sample 160Q that is outside of vertical boundary 176 with the gradient for sample 160R that is inside vertical boundary 176, as denoted by the arrow pointing from sample 160R to sample 160Q. Video encoder 200 and video decoder 300 may also replace the gradient for sample 160U that is outside of vertical boundary 176 with the gradient for sample 160V that is inside vertical boundary 176, as denoted by the arrow pointing from sample 160V to sample 160U.

In another example, video encoder 200 and video decoder 300 may calculate additional gradients in the picture, slice, tile, or tile group to replace the unavailable gradients that are outside of the picture, slice, tile, or tile group. As discussed above, video encoder 200 and video decoder 300 may calculate a gradient for every other sample in the 8×8 region 172, including calculating a gradient for every other sample in block 170, thereby calculating gradients for eight of the sixteen samples in block 170. Further, as shown in FIGS. 5B and C, horizontal boundary 174 and vertical boundary 176 may each cause eight gradients in region 172 that are outside of horizontal boundary 174 or vertical boundary 176 to be unavailable. As such, video encoder 200 and video decoder 300 may replace the eight unavailable gradients by calculating an additional eight gradients for eight additional samples in block 170.

Figure 4D:
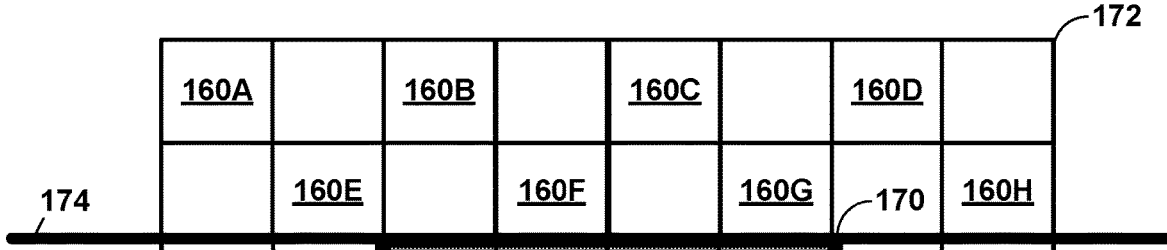

As shown in FIG. 4D, samples 160A-160H are outside of horizontal boundary 174 because samples 160A-160H are on the other side of horizontal boundary 174 from block 170. As such, the gradients for samples 160A-160H are unavailable for classifying block 170 based at least in part on accumulating subsampled gradients in the 8×8 surrounding region 172 of block 170.

In accordance with aspects of the present disclosure, when subsampled gradient values are calculated, video encoder 200 and video decoder 300 may replace the unavailable gradients by calculating an additional eight gradients for eight samples in block 170. For example, video encoder 200 and video decoder 300 may calculate gradients for samples 1621-162P within block 170, and may use the gradients for samples 1621-162P in place of unavailable gradients for samples 160A-160H to perform classification of block 170.

Figure 4E:
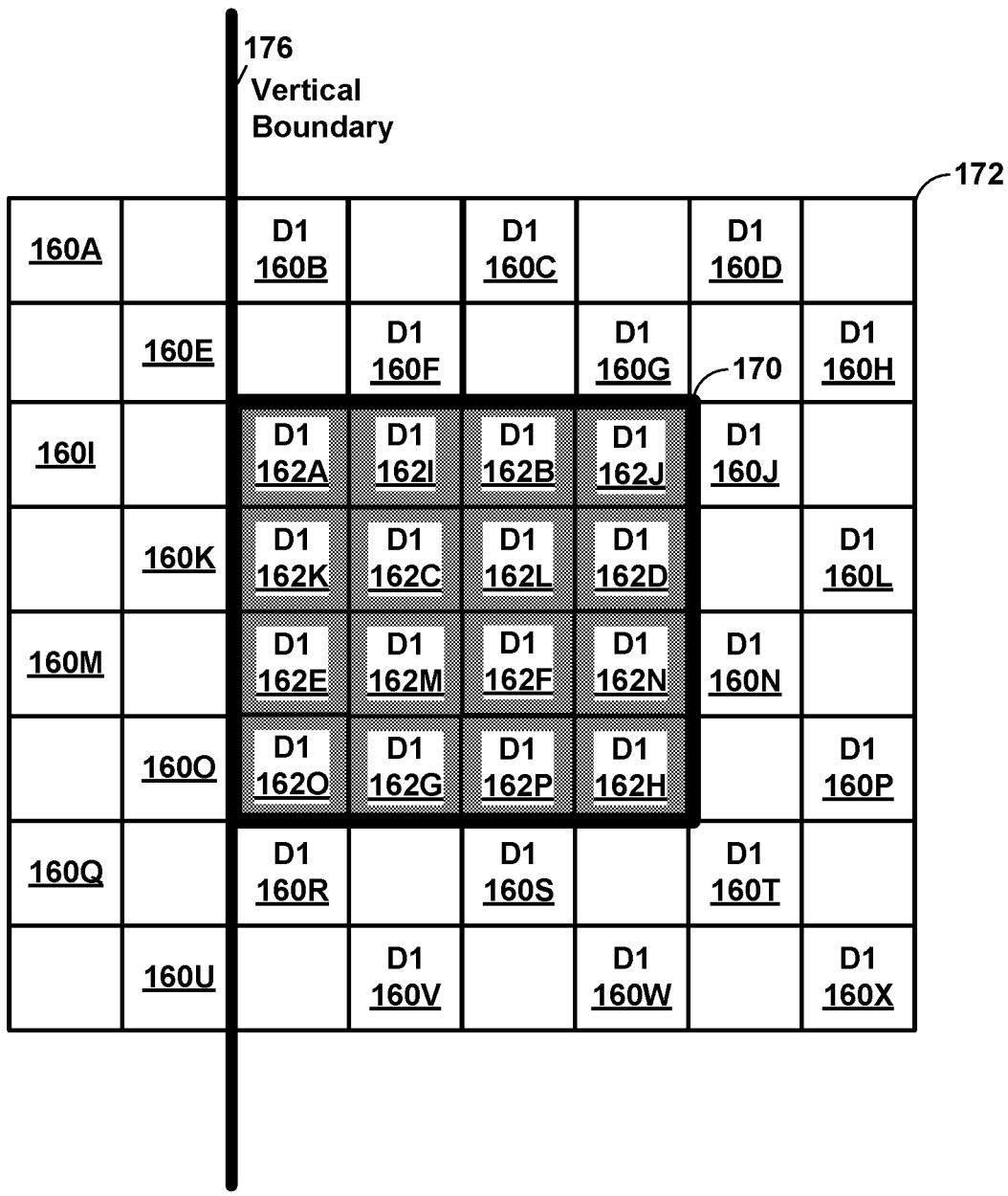

Similarly, as shown in FIG. 4E, sample 160A, sample 160E, sample 160I, sample 160K, sample 160M, sample 160O, sample 160Q, and sample 160U are outside of vertical boundary 176 because sample 160A, sample 160E, sample 160I, sample 160K, sample 160M, sample 160O, sample 160Q, and sample 160U are on the other side of vertical boundary 176 from block 170. As such, the gradients for sample 160A, sample 160E, sample 160I, sample 160K, sample 160M, sample 160O, sample 160Q, and sample 160U are unavailable for classifying block 170 based at least in part on accumulating subsampled gradients in the 8×8 surrounding region 172 of block 170.

In accordance with aspects of the present disclosure, when subsampled gradient values are calculated, video encoder 200 and video decoder 300 may replace the unavailable gradients by calculating an additional eight gradients for eight samples in block 170. For example, video encoder 200 and video decoder 300 may calculate gradients for samples 1621-162P within block 170, and may use the gradients for samples 1621-162P in place of unavailable gradients for sample 160A, sample 160E, sample 160I, sample 160K, sample 160M, sample 160O, sample 160Q, and sample 160U to perform classification of block 170.

In another example, if a gradient is out of the boundaries, the nearest gradient on the same gradient direction in picture, slice, tile, or tiles group is used. This may be applicable to horizontal gradients, vertical gradients, and diagonal gradients.

Figures 4F, 4G:
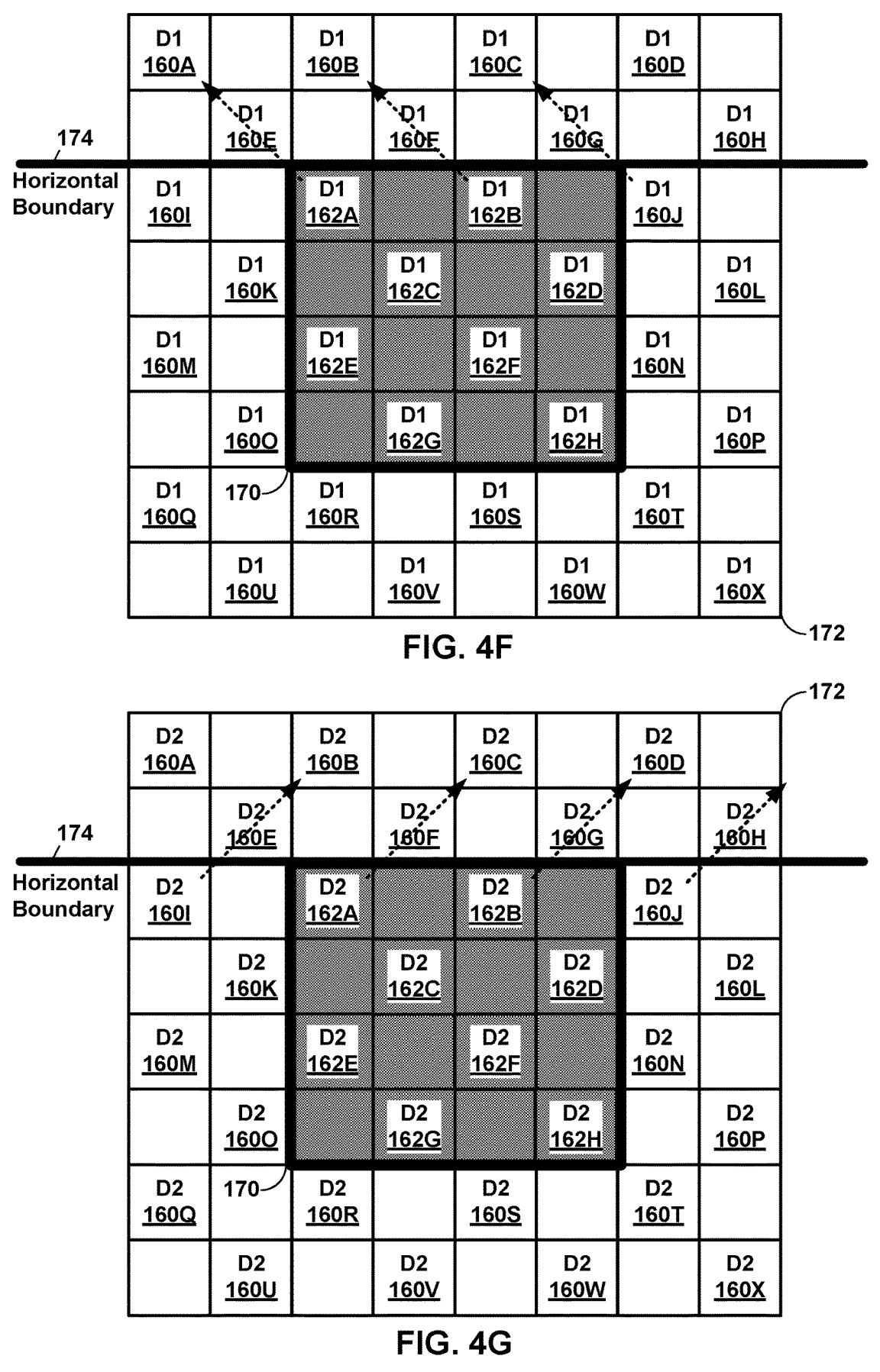

As shown in FIG. 4F, region 172 may include 135-degree diagonal gradients, denoted as "D1". As such, gradients that are outside of a boundary may be replaced with the nearest gradient in the same 135-degree diagonal direction.

In FIG. 4F, for region 172 having a horizontal boundary 174, samples 160A-160H are outside of horizontal boundary 174 because samples 160A-160H are on the other side of horizontal boundary 174 from block 170. As such, the gradients for samples 160A-160H are unavailable for classifying block 170 based at least in part on accumulating subsampled gradients in the 8×8 surrounding region 172 of block 170.

In accordance with aspects of the present disclosure, video encoder 200 and video decoder 300 may replace gradients in region 172 that are outside of horizontal boundary 174 with the nearest gradient in the same gradient direction in region 172 that are within horizontal boundary 174 (i.e., on the same side of horizontal boundary 174 as block 170).

Because FIG. 4F illustrates region 172 as having 135-degree diagonal gradients that are each denoted by "D1," each of the unavailable gradients for samples 160A-160H are 135-degree diagonal gradients, and video encoder 200 and video decoder 300 may replace each of the unavailable gradients for samples 160A-160H with the nearest available gradient along the 135-degree diagonal gradients.

Sample 162A is along the same 135-degree diagonal direction as samples 160A and 160E. Thus, the 135-degree diagonal gradients for both sample 160A and sample 160E may be replaced with the 135-degree diagonal gradient for sample 162A, as denoted by the arrow pointing from sample 162A through samples 160A and 160E.

Sample 162B is along the same 135-degree diagonal direction as samples 160B and 160F. Thus, the 135-degree diagonal gradients for both sample 160B and sample 160F may be replaced with the 135-degree diagonal gradient for sample 162B, as denoted by the arrow pointing from sample 162B through samples 160B and 160F.

Sample 160J is along the same 135-degree diagonal direction as samples 160C and 160G. Thus, the 135-degree diagonal gradients for both sample 160C and sample 160G may be replaced with the 135-degree diagonal gradient for sample 160J, as denoted by the arrow pointing from sample 160J through samples 160C and 160G.

As shown in FIG. 4G, region 172 may also include 45-degree diagonal gradients, denoted as "D2". As such, gradients that are outside of a boundary may be replaced with the nearest gradient in the same 45-degree diagonal direction.

In FIG. 4G, for region 172 having a horizontal boundary 174, samples 160A-160H are outside of horizontal boundary 174 because samples 160A-160H are on the other side of horizontal boundary 174 from block 170. As such, the gradients for samples 160A-160H are unavailable for classifying block 170 based at least in part on accumulating subsampled gradients in the 8×8 surrounding region 172 of block 170.

In accordance with aspects of the present disclosure, video encoder 200 and video decoder 300 may replace gradients in region 172 that are outside of horizontal boundary 174 with the nearest gradient in the same gradient direction in region 172 that are within horizontal boundary 174 (i.e., on the same side of horizontal boundary 174 as block 170).

Because FIG. 4G illustrates region 172 as having 45-degree diagonal gradients that are each denoted by "D2," each of the unavailable gradients for samples 160A-160H are 45-degree diagonal gradients, and video encoder 200 and video decoder 300 may replace each of the unavailable gradients for samples 160A-160H with the nearest available gradient along the 45-degree diagonal gradients.

Sample 160I is along the same 45-degree diagonal direction as samples 160B and 160E. Thus, the 45-degree diagonal gradients for both sample 160B and sample 160E may be replaced with the 45-degree diagonal gradient for sample 160I, as denoted by the arrow pointing from sample 160I through samples 160B and 160E.

Sample 162A is along the same 45-degree diagonal direction as samples 160C and 160F. Thus, the 45-degree diagonal gradients for both sample 160C and sample 160F may be replaced with the 45-degree diagonal gradient for sample 162A, as denoted by the arrow pointing from sample 162A through samples 160C and 160F.

Sample 162B is along the same 45-degree diagonal direction as samples 160D and 160G. Thus, the 45-degree diagonal gradients for both sample 160D and sample 160G may be replaced with the 45-degree diagonal gradient for sample 162B, as denoted by the arrow pointing from sample 162B through samples 160D and 160G.

Sample 160J is along the same 135-degree diagonal direction as sample 160H. Thus, the 45-degree diagonal gradient for sample 160H may be replaced with the 45-degree diagonal gradient for sample 160J, as denoted by the arrow pointing from sample 160J to sample 160H.

In another example, video encoder 200 and video decoder 300 may refrain from calculating gradients that are outside of a picture/slice/tile/tile group. Instead, video encoder 200 and video decoder 300 may perform classification of block 170 using fewer than all of the subsampled gradients in region 172.

Figure 4H:
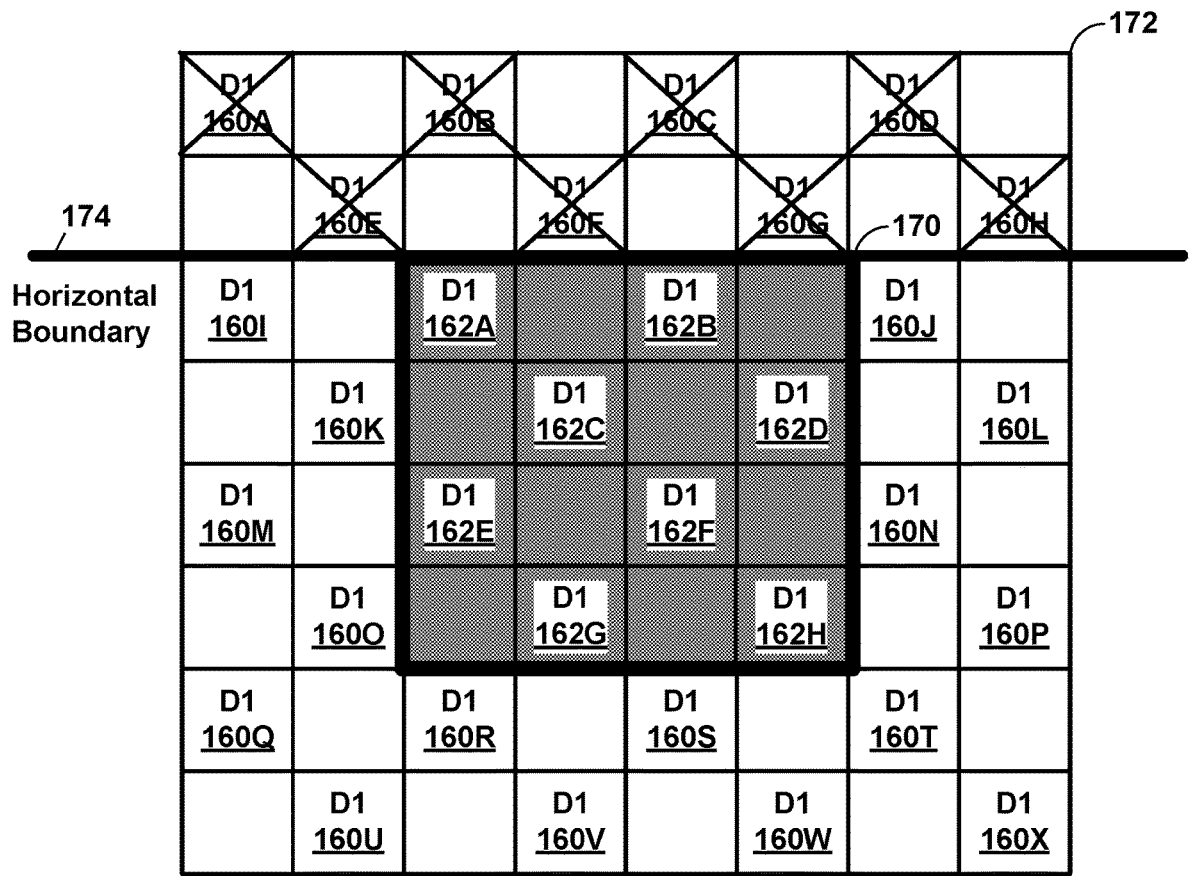

As shown in FIG. 4H, for region 172 having a horizontal boundary 174, samples 160A-160H are outside of horizontal boundary 174 because samples 160A-160H are on the other side of horizontal boundary 174 from block 170. As such, the gradients for samples 160A-160H are unavailable for classifying block 170 based at least in part on accumulating subsampled gradients in the 8×8 surrounding region 172 of block 170. Thus, video encoder 200 and video decoder 300 may refrain from determining gradients for samples 160A-160H. Instead, video encoder 200 and video decoder 300 may calculate the gradients for samples 160I-160X and samples 162A-162H to classify block 170.

Since the number of gradients are changed, video encoder 200 and video decoder 300 may renormalize the activity and classification calculation. In particular, because video encoder 200 and video decoder 300 in the example of FIG. 4H do not calculate gradients for the eight samples that are unavailable, video encoder 200 and video decoder 300 may calculate gradients for 24 samples in region 172 instead of 32 samples.

In one example, to determine the gradient values (g), video encoder 200 and video decoder 300 may be configured to determine a vertical gradient ($g_v$), a horizontal gradient ($g_h$), a 135-degree diagonal gradient ($g_{d1}$), and a 45-degree diagonal gradient ($g_{d2}$). Furthermore, to scale the gradient values (g) based on the scaling factor to produce the scaled gradient values (g'), video encoder 200 and video decoder 300 may scale the gradient values (g) using the following equation: g'=g/num_available_samples*num_full_samples, where num_available_samples represents a number of samples in the window that are not padded (e.g. a number of available samples in the window that are on a same side of a virtual boundary as the reconstructed block), and num_full_sample represents a total number of samples in the window. For example, in the example of FIG. 4H where gradients for 8 samples are unavailable, num_available_samples may be 24 and num_full_samples may be 32.

As described above, video encoder 200 and video decoder 300 may determine an adaptive loop filter for a reconstructed block of video data, such as block 170, based on the subsampled gradients calculated in a surrounding window, such as region 172, such as described with respect to FIGS. 4A-4H. In one example, video encoder 200 and video decoder 300 may determine the directionality and the activity index of the block based on the subsampled gradients calculated in a surrounding window, and may determine an adaptive loop filter for the block based on the directionality and the activity index of the block.

Figure 5:
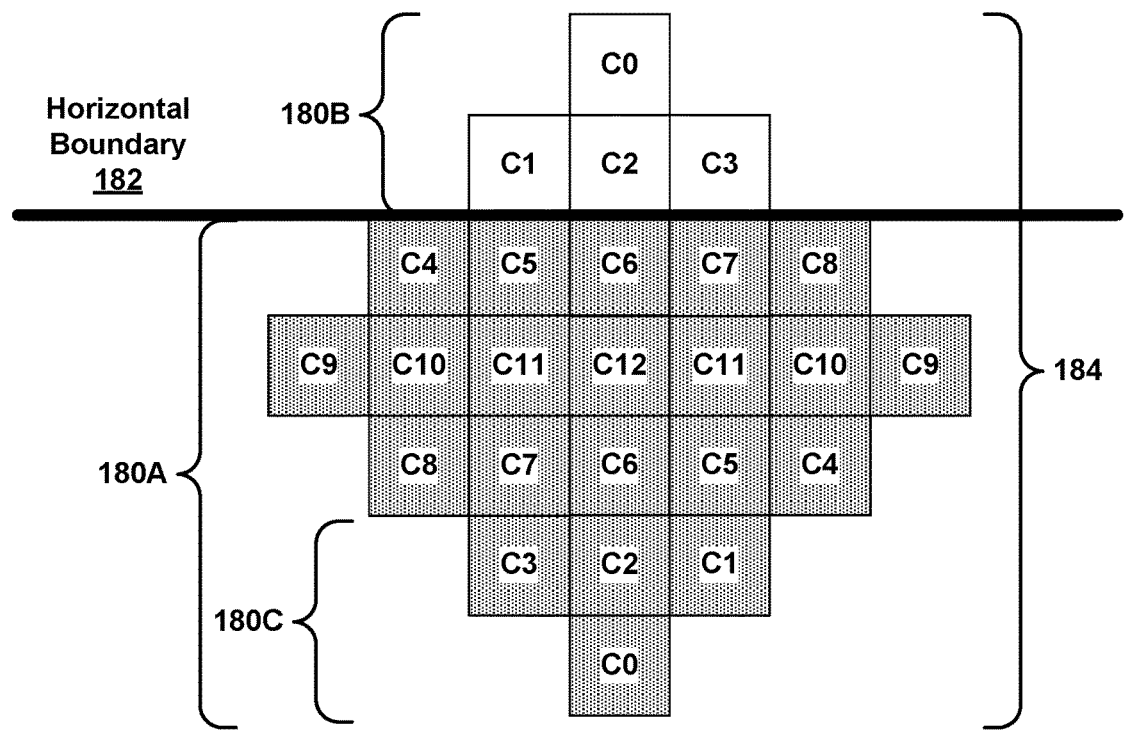
FIG. 5 illustrates an example adaptive loop filter.

FIG. 5 illustrates an example adaptive loop filter. For example, the example adaptive loop filter may be selected by video encoder 200 and video decoder 300 based upon the class of adaptive loop filter for a reconstructed block of video data, such as block 170As shown in FIG. 5, filter 184 may be a symmetric filter, such as a 7×7 diamond-shaped filter. In other examples, the techniques may equally be applicable to any other symmetric filters, such as a 5×5 diamond-shaped filter, a 9×9 diamond-shaped filter, and the like, including rectangular-shaped filters, octagonal-shaped filters, cross-shaped filters, X-shaped filters, T-shaped filters, or any other symmetric filters. Filter supports 180A of filter 184 corresponds to samples that are within horizontal boundary 182 and, thus, may be available while filter supports 180B of filter 184 corresponds to samples that are outside of horizontal boundary 182 and, thus, may be unavailable.

In one example, video encoder 200 and video decoder 300 may use asymmetric partial filters to filter samples of a reconstructed block of video data. In this case, video encoder 200 and video decoder 300 may only filter taps corresponding to available samples to filter samples, thereby skipping filter taps whose corresponding samples are not available. Video encoder 200 and video decoder 300 may perform renormalization due to the skipping of filter taps whose corresponding samples are not available, as described below.

In accordance with aspects of the present disclosure, video coder may use the available filter supports 180A of filter 184 as an asymmetric partial filter that video encoder 200 and video decoder 300 may apply to reconstructed samples to generate filtered samples, as part of performing ALF. By using the available filter supports 180A of filter 184, video encoder 200 and video decoder 300 may skip filter taps whose corresponding samples are not available, such as in filter supports 180B. A partial filter is a filter that does not use one or more filter coefficients that are typically used for the filtering process. In this way, a filter may be generated from the available samples for filters while skipping filter taps whose corresponding samples are not available. Video encoder 200 and video decoder 300 may renormalize the asymmetric partial filter Normally, filter coefficients for the selected filter sum to one (meaning the filters coefficients are normalized) so as not to add or remove video data through application of the filter. By skipping or removing filter coefficients of the selected filter in order to determine the partial filter (which is termed a "partial" filter again due to the removal of the one or more filter coefficients from the originally selected filter), the resulting partial filter becomes un-normalized (meaning the filter coefficients of the partial filter do not sum to one). As a result, video encoder 200 and video decoder 300 may renormalize the plurality of filter coefficients included within the partial filter so that the filter coefficients sum to one, such as by scaling each of the filter coefficients within the partial filter. Video encoder 200 and video decoder 300 may then apply the renormalized partial filter near the boundary of the first block of the video data to generate a filtered first block of the video data. Video encoder 200 and video decoder 300 may store this filtered first block of the video data for use as reference video data in reconstructing other blocks of the video data. Video encoder 200 and video decoder 300 may apply the generated filter to, for example, samples in a reconstructed block of video data, such as in block 170 to generate filtered samples.

In one example, video encoder 200 and video decoder 300 may use mirror sample padding to replace filter coefficients that correspond to unavailable samples with filter coefficients that correspond to available samples. In mirror padding, filter supports of a filter that corresponds to (e.g., has the same size and the same shape, when flipped, of) unavailable samples may be replaced with corresponding filter supports of the filter that correspond to available samples. In the example of FIG. 5, video encoder 200 and video decoder 300 may generate a symmetric filter by performing mirror padding to replace filter supports 180B with, for example, filter supports 180C of filter 184 that corresponds to available samples, so that the filter coefficients in filter supports 180C are used in place of the filter coefficients of filter supports 180B. Video encoder 200 and video decoder 300 may apply the generated filter to, for example, samples in a reconstructed block of video data, such as in block 170 to generate filtered samples.

In another example, video encoder 200 and video decoder 300 may use symmetric partial filters to filter a block of video data. In this case, not only may video encoder 200 and video decoder 300 skip filter taps whose corresponding samples are not available, video encoder 200 and video decoder 300 may further skip one or more filter taps corresponding to available samples in order to generate a symmetric partial filter. Video encoder 200 and video decoder 300 may perform renormalization due to the skipping of filter taps, as described above.

Figure 6:
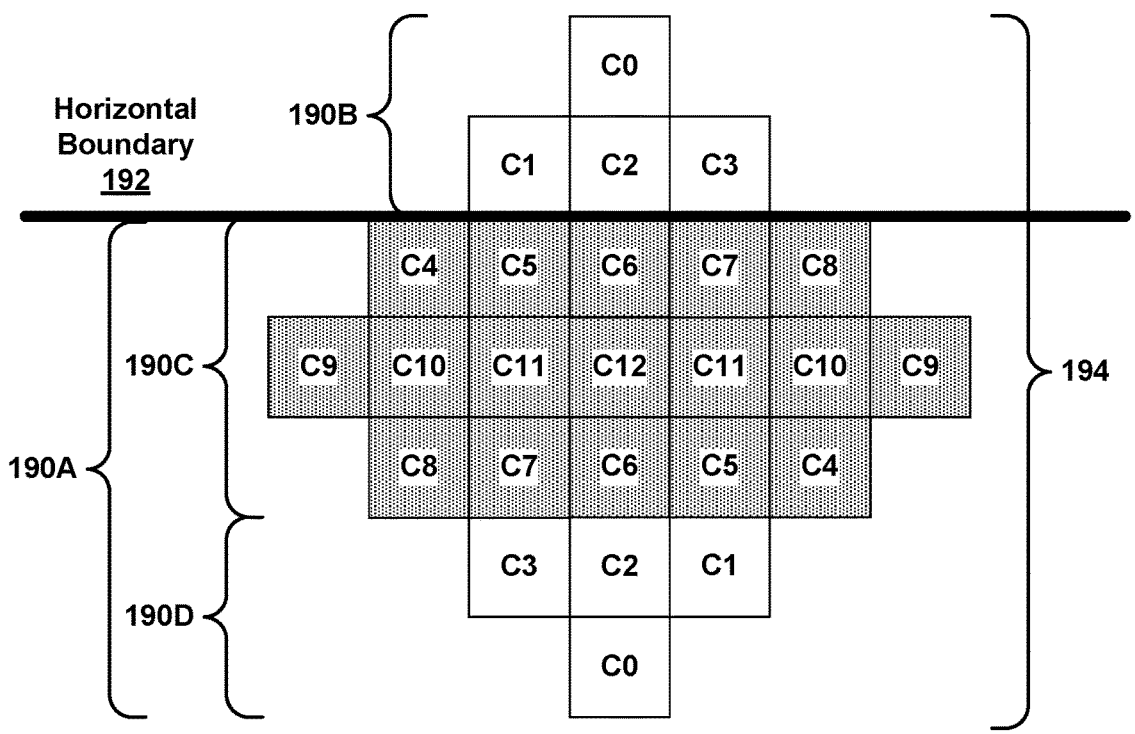
FIG. 6 illustrates an example adaptive loop filter

FIG. 6 illustrates an example adaptive loop filter. As shown in FIG. 6, filter supports 190A of filter 194 is within horizontal boundary 192 while filter supports 190B of filter 194 is outside of horizontal boundary 192 and, thus, may be unavailable. In accordance with aspects of the present disclosure, video coder may use the available filter supports 190A of filter 194 to generate a symmetric partial filter. In particular, video coder may determine a symmetric portion 190C of available filter supports 190A of filter 194 as the symmetric partial filter, such as by truncating filter supports 190D of available filter supports 190A from filter 194, where filter supports 190D of filter 194 corresponds to (e.g., has the same size and the same shape, when flipped, of) the unavailable filter supports 190B of filter 194. For example, in FIG. 6, each sample in 190B and 190D is replaced with the closest sample in 190C. Sample at C1 is replaced with sample at C5, samples at C0 and C2 are replaced with sample at C6, and sample at C3 is replaced with sample at C7.

In this way, video encoder 200 and video decoder 300 may generate a filter from the available samples for filters while skipping filter taps whose corresponding samples are not available. Video encoder 200 and video decoder 300 may renormalize the symmetric partial filter, so that, for example, the filter coefficients of the symmetric partial filter sums to one. Video encoder 200 and video decoder 300 may apply the generated filter to, for example, samples in a reconstructed block of video data, such as in block 170 to generate filtered samples.

In some examples, video encoder 200 and video decoder 300 may perform filtering of video data that includes weighted summing. In particular, weighted summing is a weighted averaging process is added after the filtering process for those samples that uses one or more unavailable samples (e.g., samples out of picture/slice/tile/tile group, as described throughout this disclosure) during filtering. A final ALF output sample is a weighted averaging of the filtered sample and the ALF input sample (e.g., a sample after ALF and a sample of a reconstructed block of video data prior to ALF, respectively). Video encoder 200 and video decoder 300 may apply (i.e., multiply) a first weight to a sample value of a sample of the reconstructed block of video data prior to ALF and may apply (i.e., multiply) a second weight to a sample value of the sample after ALF, where the two weights sum to one. Video encoder 200 and video decoder 300 may sum the two weighed samples divide the sum by two to determine the weighted average for the sample.

In one example, the weight for the filtered sample could be fixed for all samples. For example, when the first weight is fixed to a first value and the second weight is fixed to a second value for all samples, and where the two weights sum to one, video encoder 200 and video decoder 300 may, for each sample, apply the first weight to the sample value of the sample prior to ALF and apply the second weight to the sample value of sample after ALF, sum up the two weighed samples, and divide the sum by two to generate the final value for the sample.

In another example, the weight for the filtered sample could be dependent on the number of unavailable samples used during the filtering process. The greater the number of unavailable samples used during the filtering process, the greater the weight that is applied to a sample of the reconstructed block of video data prior to ALF compared to the weight that is applied to the same sample after ALF. For example, if no unavailable samples are used during the filtering process of a sample during ALF, the first weight to be applied to the sample prior to ALF may be zero, and the second weight to be applied to the sample after ALF may be one. On the other hand the first weight may increase according to the number of unavailable samples that are used during the filtering process for the sample, and the second weight may correspondingly decrease according to the number of unavailable samples that are used during the filtering process.

In another example, the weight for the filtered sample could be signaled adaptively, such as at sequence/picture/slice/tile/tile group/CTU level. For example, encoder 200 may adaptively signal both the first weight and the second weight to decoder 300, such as at sequence/picture/slice/tile/tile group/CTU level.

In some examples, video encoder 200 and video decoder 300 may conditionally disable filtering for samples that uses unavailable samples (e.g., samples out of picture, slice, tile, or tiles group) for filtering. In one example, for current to-be-filtered sample, if the absolute sum of the coefficients corresponding to unavailable samples is greater than a threshold times the absolute sum of the coefficients corresponding to available samples, then video encoder 200 and video decoder 300 may disable the filter for the current sample. This threshold can be fixed, adaptively determined, or signaled (e.g., in the bitstream sent by video encoder 200 to video decoder 300). Examples of the threshold include 0.6 or may be any suitable value, such as between 0 and 1.

Figure 7:
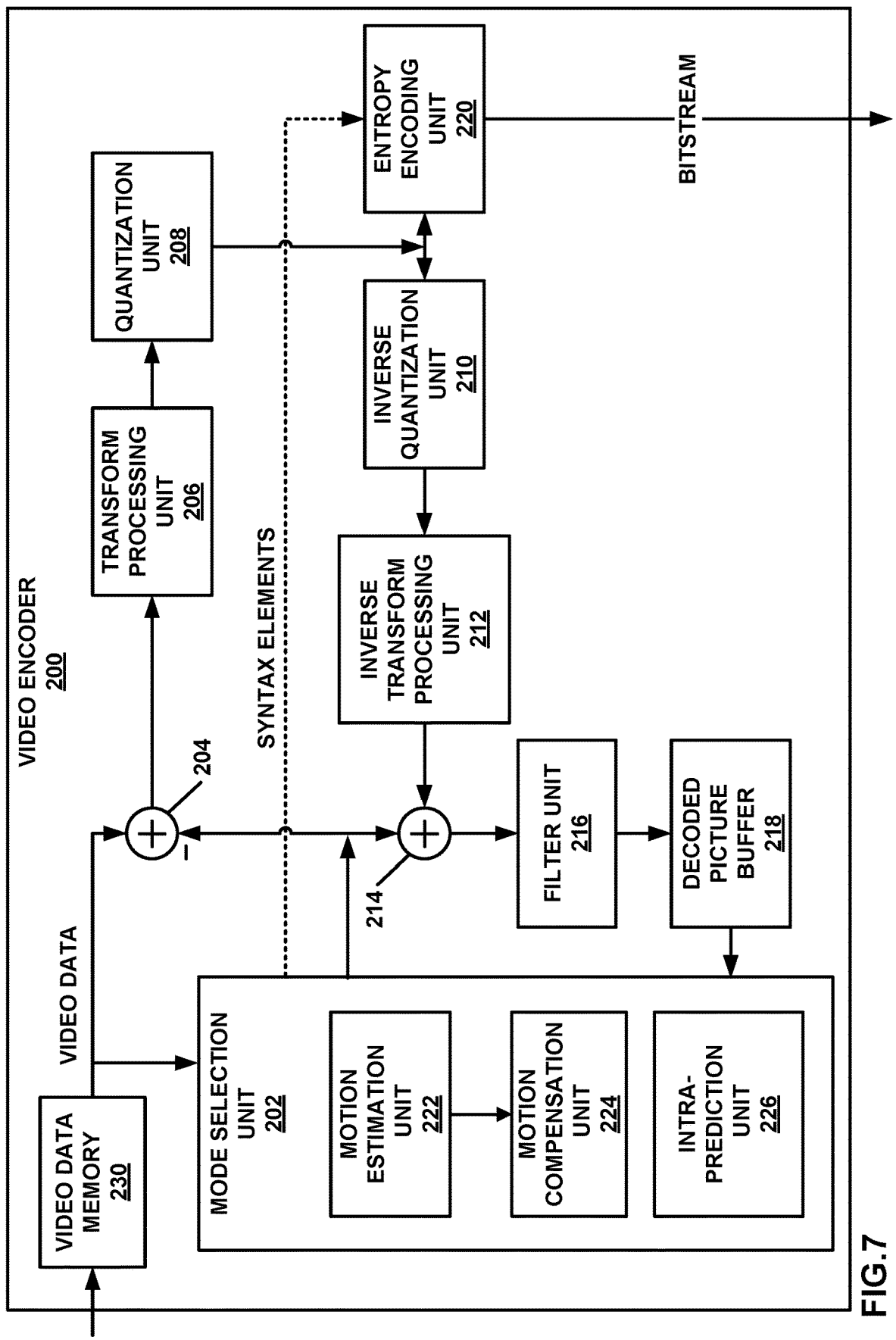
FIG. 7 is a block diagram illustrating an example video encoder that may perform the techniques of this disclosure.

FIG. 7 is a block diagram illustrating an example video encoder 200 that may perform the techniques of this disclosure. FIG. 7 is provided for purposes of explanation and should not be considered limiting of the techniques as broadly exemplified and described in this disclosure. For purposes of explanation, this disclosure describes video encoder 200 according to the techniques of JEM, VVC (ITU-T H.266, under development), and HEVC (ITU-T H.265). However, the techniques of this disclosure may be performed by video encoding devices that are configured to other video coding standards.

In the example of FIG. 7, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions. In some examples, video encoder 200 may be part of a camera, a computer, a mobile device, a broadcast receiver device, or a set-top box.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 7 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more SAO, GALF, ALF, and/or deblocking operations on the reconstructed coding blocks associated with a CU. For example, filter unit 216 may perform deblocking operations to reduce blockiness artifacts along edges of CUs. Operations of filter unit 216 may be skipped, in some examples.

In particular, filter unit 216 may be configured to perform the ALF and GALF techniques of this disclosure that are described above. For example, filter unit 216 may be configured to determine a value of a gradient for a sample in a reconstructed coding block, including performing a gradient calculation for the sample using an unavailable sample that is outside of one of: a picture, a slice, a tile, or a tile group that includes the reconstructed block of samples, determine an adaptive loop filter for the reconstructed coding block based at least in part on the determined value of the gradient for the sample, and apply the determined adaptive loop filter to the reconstructed coding block to generate a filtered block of video data.

In some examples, filter unit 216 may be configured to determine gradient values for a window that covers the reconstructed coding block, the window including samples of the reconstructed block of video data and samples that surround the reconstructed block of video data, including performing a gradient calculation using an unavailable sample, such as according to the techniques of the present disclosure, and to determine the adaptive loop filter for the reconstructed coding block based at least in part on the determined gradient values for the window. This may, for example, include replacing unavailable gradient values for samples within the window that are outside a boundary of one of: a picture, a slice, a tile, or a tile group with one or more gradient values that are inside the boundary, where the one of: the picture, the slice, the tile, or the tile group includes the reconstructed coding block, such as according to the techniques of the present disclosure.

In some examples, filter unit 216 may be configured to refrain from including unavailable gradient values for samples within the window that are outside a boundary of one of: the picture, the slice, the tile, or the tile group in the gradient values for the window, where the one of: the picture, the slice, the tile, or the tile group includes the reconstructed block of video data. filter unit 216 may normalize the gradient values for the window due to not including unavailable gradient values for samples within the window in the gradient values for the window.

In some examples, filter unit 216 may be configured to, in response to the adaptive loop filter utilizing filter supports corresponding to unavailable samples, determine a partial filter from the adaptive loop filter that does not use the filter supports corresponding to the unavailable samples, where the partial filter includes one of: an asymmetric partial filter or a symmetric partial filter. In other examples, filter unit 216 may be configured to, in response to the adaptive loop filter utilizing filter supports corresponding to unavailable samples, performing mirror padding to replace the filter supports corresponding to the unavailable samples.

In some examples, filter unit 216 may be configured to conditionally disable filtering of a particular sample of the reconstructed coding block based at least in part on at least one of: whether determining a one or more gradient values for the particular sample includes performing one or more gradient calculations for the particular sample using one or more unavailable samples, or whether determining the gradient values for the window that covers the reconstructed block of video data includes determining one or more gradient values for one or more samples within the window that are outside a boundary of one of: the picture, the slice, the tile, or the tile group, where the reconstructed block of video data is inside the boundary.

In some examples, filter unit 216 may be configured to determining a weighted average of a particular sample in the reconstructed block and a sample of the filtered block of video data based at least in part on at least one of: whether determining a one or more gradient values for the particular sample includes performing one or more gradient calculations for the particular sample using one or more unavailable samples, or whether determining the gradient values for the window that covers the reconstructed block of video data includes determining one or more gradient values for one or more samples within the window that are outside a boundary of one of: the picture, the slice, the tile, or the tile group, where the reconstructed block of video data is inside the boundary.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to reconstruct a block of video data to create a reconstructed block of video data, determine a value of a gradient for a sample in the reconstructed block of video data, including performing a gradient calculation for the sample using an unavailable sample that is outside of one of: a picture, a slice, a tile, or a tile group that includes the reconstructed block of samples, determine an adaptive loop filter for the reconstructed block of video data based at least in part on the determined value of the gradient for the sample, and apply the determined adaptive loop filter to the reconstructed block of video data to generate a filtered block of video data.

Figure 8:
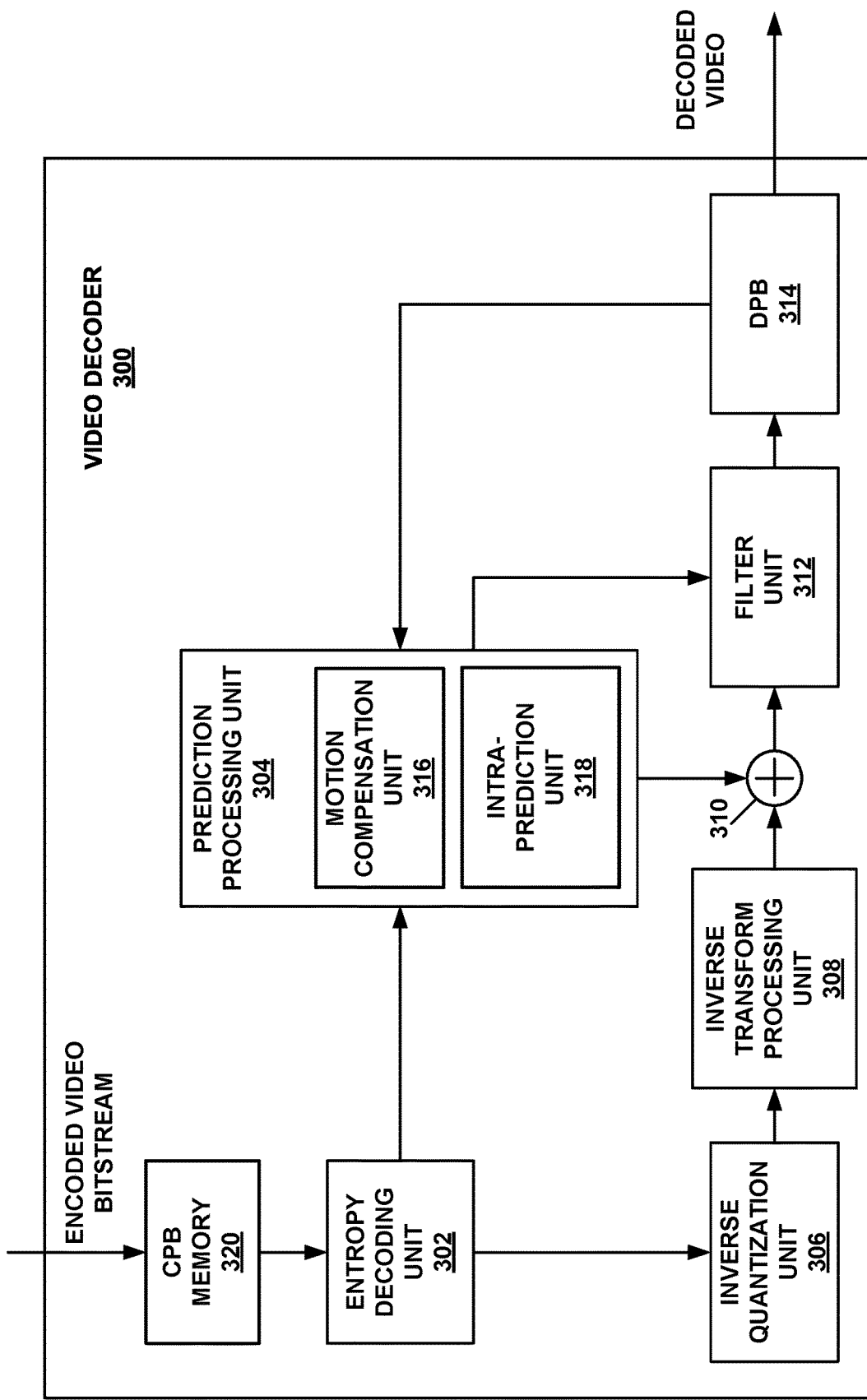
FIG. 8 is a block diagram illustrating an example video decoder that may perform the techniques of this disclosure.

FIG. 8 is a block diagram illustrating an example video decoder 300 that may perform the techniques of this disclosure. FIG. 8 is provided for purposes of explanation and is not limiting on the techniques as broadly exemplified and described in this disclosure.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions. In some examples, video decoder 300 may be part of a camera, a computer, a mobile device, a broadcast receiver device, or a set-top box.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 8 are illustrated to assist with understanding the operations performed by video decoder 300. The units may be implemented as fixed-function circuits, programmable circuits, or a combination thereof. Similar to FIG. 7, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 7).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 7). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. In particular, filter unit 312 may be configured to perform the ALF and GALF techniques of this disclosure that are described above. For example, filter unit 312 may be configured to determine a value of a gradient for a sample in a reconstructed coding block, including performing a gradient calculation for the sample using an unavailable sample that is outside of one of: a picture, a slice, a tile, or a tile group that includes the reconstructed block of samples, determine an adaptive loop filter for the reconstructed coding block based at least in part on the determined value of the gradient for the sample, and apply the determined adaptive loop filter to the reconstructed coding block to generate a filtered block of video data.

In some examples, filter unit 312 may be configured to determine gradient values for a window that covers the reconstructed coding block, the window including samples of the reconstructed block of video data and samples that surround the reconstructed block of video data, including performing a gradient calculation using an unavailable sample, such as according to the techniques of the present disclosure, and to determine the adaptive loop filter for the reconstructed coding block based at least in part on the determined gradient values for the window. This may, for example, include replacing unavailable gradient values for samples within the window that are outside a boundary of one of: a picture, a slice, a tile, or a tile group with one or more gradient values that are inside the boundary, where the one of: the picture, the slice, the tile, or the tile group includes the reconstructed coding block, such as according to the techniques of the present disclosure.

In some examples, filter unit 312 may be configured to refrain from including unavailable gradient values for samples within the window that are outside a boundary of one of: the picture, the slice, the tile, or the tile group in the gradient values for the window, where the one of: the picture, the slice, the tile, or the tile group includes the reconstructed block of video data. filter unit 216 may normalize the gradient values for the window due to not including unavailable gradient values for samples within the window in the gradient values for the window.

In some examples, filter unit 312 may be configured to, in response to the adaptive loop filter utilizing filter supports corresponding to unavailable samples, determine a partial filter from the adaptive loop filter that does not use the filter supports corresponding to the unavailable samples, where the partial filter includes one of: an asymmetric partial filter or a symmetric partial filter. In other examples, filter unit 216 may be configured to, in response to the adaptive loop filter utilizing filter supports corresponding to unavailable samples, perform mirror padding to replace the filter supports corresponding to the unavailable samples.

In some examples, filter unit 312 may be configured to conditionally disable filtering of a particular sample of the reconstructed coding block based at least in part on at least one of: whether determining a one or more gradient values for the particular sample includes performing one or more gradient calculations for the particular sample using one or more unavailable samples, or whether determining the gradient values for the window that covers the reconstructed block of video data includes determining one or more gradient values for one or more samples within the window that are outside a boundary of one of: the picture, the slice, the tile, or the tile group, where the reconstructed block of video data is inside the boundary.

In some examples, filter unit 312 may be configured to determine a weighted average of a particular sample in the reconstructed block and a sample of the filtered block of video data based at least in part on at least one of: whether determining a one or more gradient values for the particular sample includes performing one or more gradient calculations for the particular sample using one or more unavailable samples, or whether determining the gradient values for the window that covers the reconstructed block of video data includes determining one or more gradient values for one or more samples within the window that are outside a boundary of one of: the picture, the slice, the tile, or the tile group, where the reconstructed block of video data is inside the boundary.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to reconstruct a block of video data to create a reconstructed block of video data, determine a value of a gradient for a sample in the reconstructed block of video data, including performing a gradient calculation for the sample using an unavailable sample that is outside of one of: a picture, a slice, a tile, or a tile group that includes the reconstructed block of samples, determine an adaptive loop filter for the reconstructed block of video data based at least in part on the determined value of the gradient for the sample, and apply the determined adaptive loop filter to the reconstructed block of video data to generate a filtered block of video data.

Figure 9:
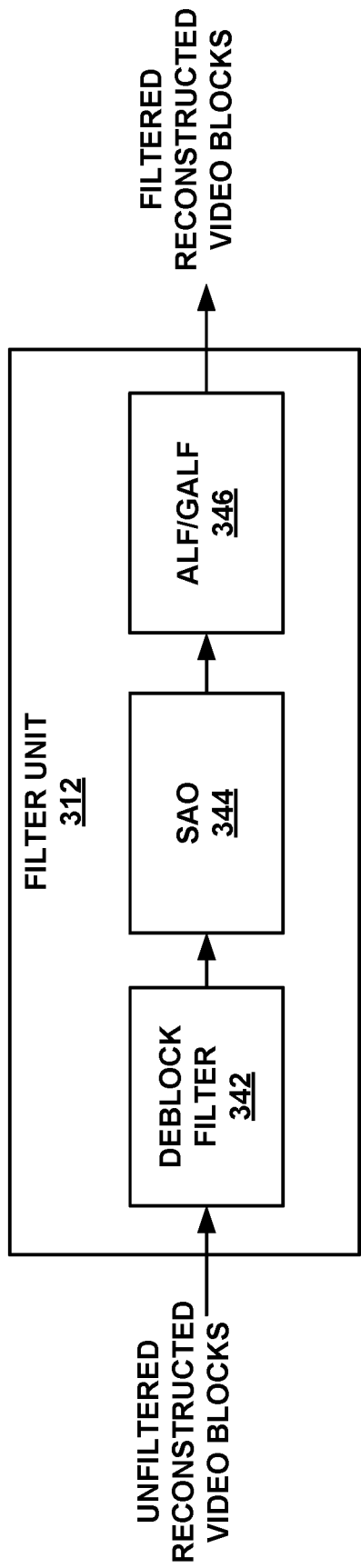
FIG. 9 illustrates an example implementation of a filter unit for performing the techniques of this disclosure.

FIG. 9 illustrates an example implementation of a filter unit for performing the techniques of this disclosure. Filter units 216 and 312 may perform the techniques of this disclosure, possibly in conjunction with other components of video encoder 200 or video decoder 300. In the example of FIG. 9, filter unit 216 and filter unit 312 include deblock filter 342, SAO filter 344, and ALF/GLAF filter 346. SAO filter 344 may, for example, be configured to determine offset values for samples of a block.

Filter unit 216 and filter unit 312 may include fewer filters and/or may include additional filters. Additionally, the particular filters shown in FIG. 9 may be implemented in a different order. Other loop filters (either in the coding loop or after the coding loop) may also be used to smooth sample transitions or otherwise improve the video quality.

Deblock filter 342 may be configured to perform deblocking filtering of a reconstructed block of video data. SAO filter 344 may be configured to perform SAO filtering of the deblocked reconstructed block of video data that is output by deblock filter 342. ALF/GALF filter 346 may be configured to perform ALF or GALF of the deblocked and SAO filtered reconstructed block of video data that is output by SAO filter 344.

In particular, ALF/GALF filter 346 may be configured to determine a value of a gradient for a sample in the deblocked and SAO filtered reconstructed block of video data, including performing a gradient calculation for the sample using an unavailable sample that is outside of one of: a picture, a slice, a tile, or a tile group that includes the reconstructed block of samples, determine an adaptive loop filter for the deblocked and SAO filtered reconstructed block of video data based at least in part on the determined value of the gradient for the sample, and apply the determined adaptive loop filter to the deblocked and SAO filtered reconstructed block of video data to generate a filtered block of video data.

In some examples, ALG/GALF filter 346 may be configured to determine gradient values for a window that covers the deblocked and SAO filtered reconstructed block of video data, the window including samples of the reconstructed block of video data and samples that surround the reconstructed block of video data, including performing a gradient calculation using an unavailable sample, such as according to the techniques of the present disclosure, and to determine the adaptive loop filter for the deblocked and SAO filtered reconstructed block of video data based at least in part on the determined gradient values for the window. This may, for example, include replacing unavailable gradient values for samples within the window that are outside a boundary of one of: a picture, a slice, a tile, or a tile group with one or more gradient values that are inside the boundary, where the one of: the picture, the slice, the tile, or the tile group includes the deblocked and SAO filtered reconstructed block of video data, such as according to the techniques of the present disclosure.

In some examples, ALG/GALF filter 346 may be configured to refrain from including unavailable gradient values for samples within the window that are outside a boundary of one of: the picture, the slice, the tile, or the tile group in the gradient values for the window, where the one of: the picture, the slice, the tile, or the tile group includes the reconstructed block of video data. ALG/GALF filter 346 may normalize the gradient values for the window due to not including unavailable gradient values for samples within the window in the gradient values for the window.

In some examples, ALG/GALF filter 346 may be configured to, in response to the adaptive loop filter utilizing filter supports corresponding to unavailable samples, determine a partial filter from the adaptive loop filter that does not use the filter supports corresponding to the unavailable samples, where the partial filter includes one of: an asymmetric partial filter or a symmetric partial filter. In other examples, ALG/GALF filter 346 may be configured to, in response to the adaptive loop filter utilizing filter supports corresponding to unavailable samples, performing mirror padding to replace the filter supports corresponding to the unavailable samples.

In some examples, ALG/GALF filter 346 may be configured to conditionally disable filtering of a particular sample of the deblocked and SAO filtered reconstructed block of video data based at least in part on at least one of: whether determining a one or more gradient values for the particular sample includes performing one or more gradient calculations for the particular sample using one or more unavailable samples, or whether determining the gradient values for the window that covers the reconstructed block of video data includes determining one or more gradient values for one or more samples within the window that are outside a boundary of one of: the picture, the slice, the tile, or the tile group, where the reconstructed block of video data is inside the boundary.

In some examples, ALG/GALF filter 346 may be configured to determining a weighted average of a particular sample in the reconstructed block and a sample of the filtered block of video data based at least in part on at least one of: whether determining a one or more gradient values for the particular sample includes performing one or more gradient calculations for the particular sample using one or more unavailable samples, or whether determining the gradient values for the window that covers the reconstructed block of video data includes determining one or more gradient values for one or more samples within the window that are outside a boundary of one of: the picture, the slice, the tile, or the tile group, where the reconstructed block of video data is inside the boundary.

The decoded video blocks in a given frame or picture are then stored in DPB 314, which stores reference pictures used for subsequent motion compensation. DPB 314 may be part of or separate from additional memory that stores decoded video for later presentation on a display device, such as display device 118 of FIG. 1.

Figure 10:
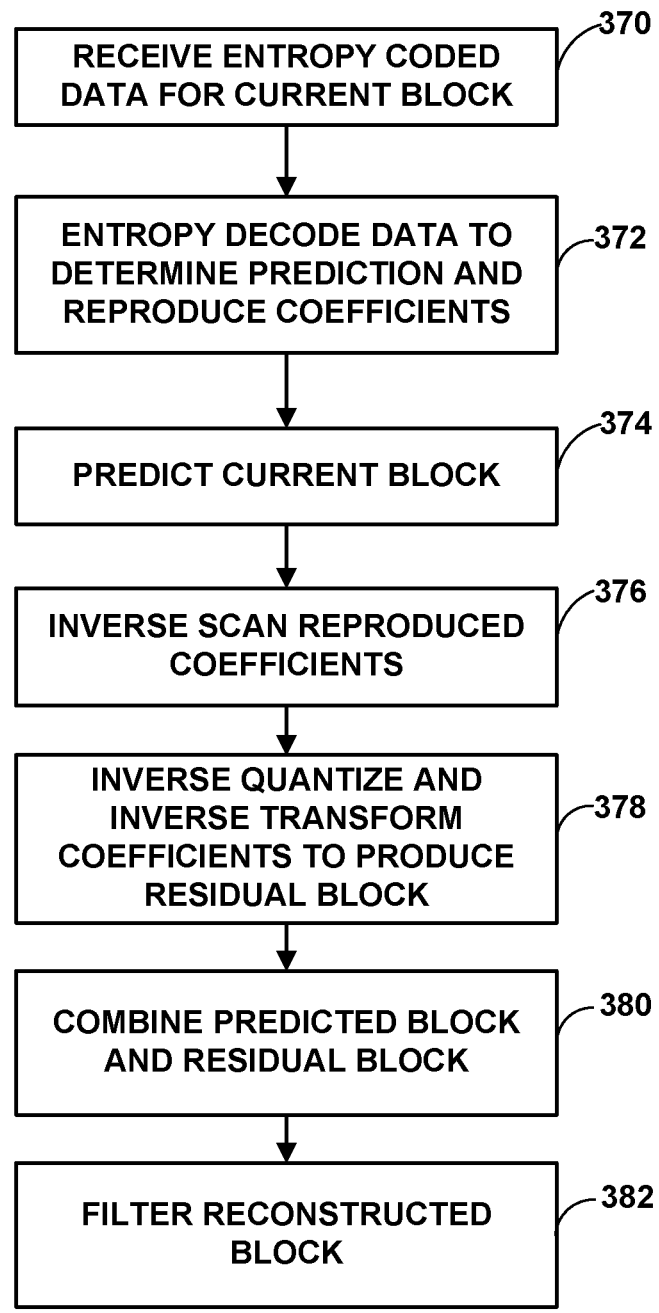
FIG. 10 is a flowchart illustrating an example method for decoding a current block.

FIG. 10 is a flowchart illustrating an example method for decoding a current block of video data. The current block may include a current CU. Although described with respect to video decoder 300 (FIGS. 1 and 8), it should be understood that other devices may be configured to perform a method similar to that of FIG. 10.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

In some examples, video decoder 300 may perform filtering of the decoded block, such as deblock filtering, SAO filtering, and ALF filtering. For example, as part of performing ALF filtering, video decoder 300 may determine a value of a gradient for a sample in a reconstructed coding block, including performing a gradient calculation for the sample using an available sample that corresponds to an unavailable sample that is outside of one of: a picture, a slice, a tile, or a tile group that includes the reconstructed block of samples, determine an adaptive loop filter for the reconstructed coding block based at least in part on the determined value of the gradient for the sample, and apply the determined adaptive loop filter to the reconstructed coding block to generate a filtered block of video data.

In some examples, as part of performing ALF filtering, video decoder 300 may determine gradient values for a window that covers the reconstructed coding block, the window including samples of the reconstructed block of video data and samples that surround the reconstructed block of video data, including performing a gradient calculation using an unavailable sample, such as according to the techniques of the present disclosure, and to determine the adaptive loop filter for the reconstructed coding block based at least in part on the determined gradient values for the window. This may, for example, include replacing unavailable gradient values for samples within the window that are outside a boundary of one of: a picture, a slice, a tile, or a tile group with one or more gradient values that are inside the boundary, where the one of: the picture, the slice, the tile, or the tile group includes the reconstructed coding block, such as according to the techniques of the present disclosure.

Figure 11:
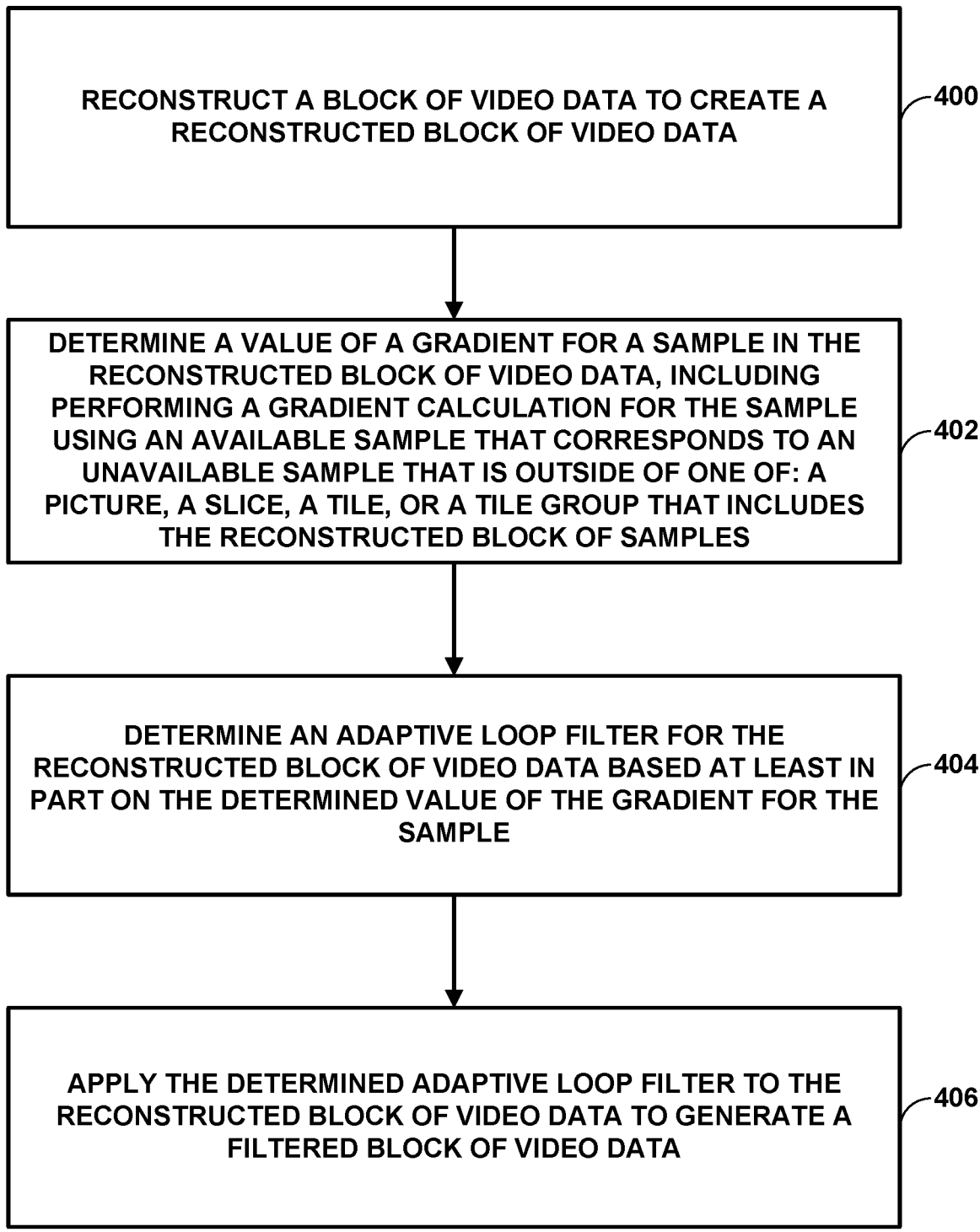
FIG. 11 is a flowchart illustrating an example method for coding video data.

FIG. 11 is a flowchart illustrating an example method for coding video data. The method may be performed by video encoder 200 (FIGS. 1 and 7) and/or video decoder 300 (FIGS. 1 and 8). Although described with respect to video encoder 200 and video decoder 300, it should be understood that other devices may be configured to perform a method similar to that of FIG. 11. In some examples, the techniques of FIG. 11 may be performed filter unit 216 of FIG. 7 and/or filter unit 312 of FIG. 8. In other examples, the techniques of FIG. 11 may be performed by one or more other structural units of video encoder 200 and/or video decoder 300.

In the example of FIG. 11, video encoder 200 and/or video decoder 300 may reconstruct a block of video data to create a reconstructed block 170 of video data (400). For example, video encoder 200 and/or video decoder 300 may perform deblocking or SAO filtering to the reconstructed block of video data prior to performing ALF on the reconstructed block of video data.

Video encoder 200 and/or video decoder 300 may determine a value of a gradient for a sample in the reconstructed block of video data 170, including performing a gradient calculation for the sample using an available sample that corresponds to an unavailable sample that is outside of one of: a picture, a slice, a tile, or a tile group that includes the reconstructed block of sample data 170 (402).

In some examples, video encoder 200 and/or video decoder 300 may perform the gradient calculation for the sample using an available neighboring sample along a gradient direction of the gradient of the sample in place of the unavailable sample. In some examples, video encoder 200 and/or video decoder 300 may perform mirror padding to determining an available neighboring sample that corresponds to the unavailable neighboring sample and may perform the gradient calculation for the sample using the available neighboring sample.

In some examples, video encoder 200 and/or video decoder 300 may determine gradient values for a window 172 that covers the reconstructed block of video data 170, the window including samples of the reconstructed block of video data 170 and samples that surround the reconstructed block of video data 170.

Video encoder 200 and/or video decoder 300 may determine an adaptive loop filter for the reconstructed block of video data 170 based at least in part on the determined value of the gradient (404).

In some examples, video encoder 200 and/or video decoder 300 may determine an adaptive loop filter for the reconstructed block of video data 170 based at least in part on the determined gradient values for the window.

In some examples, video encoder 200 and/or video decoder 300 may replace unavailable gradient values for samples within the window 172 that are outside a boundary of one of: the picture, the slice, the tile, or the tile group with one or more gradient values that are inside the boundary, where the one or more of: the picture, the slice, the tile, or the tile group includes the reconstructed block of video data 170.

In some examples, the boundary includes a horizontal boundary 174, and video encoder 200 and/or video decoder 300 may determine a gradient value for a sample within the window 172 and outside the horizontal boundary 174 as a nearest gradient value of a sample inside the horizontal boundary 174 that is on the same column as the sample within the window 172 and outside the horizontal boundary 174.

In some examples, the boundary includes a vertical boundary 176, and video encoder 200 and/or video decoder 300 may determine a gradient value for a sample within the window 172 and outside the vertical boundary 176 as a nearest gradient value of a sample inside the vertical boundary 176 that is on the same row as the sample within the window 172 and outside the vertical boundary 176.

In some examples, video encoder 200 and/or video decoder 300 may determine a diagonal gradient value for a sample within the window 172 and outside the boundary as a nearest diagonal gradient value of a sample inside the boundary that is on the same gradient direction as the diagonal gradient value of the sample within the window 172 and outside the boundary.

In some examples, video encoder 200 and/or video decoder 300 may determine additional gradient values for additional samples within the reconstructed block of video data 170 to replace the unavailable gradient values for the samples within the window 172 that are outside the boundary.

In some examples, video encoder 200 and/or video decoder 300 may refrain from including unavailable gradient values for samples within the window 172 that are outside a boundary of one of: the picture, the slice, the tile, or the tile group in the gradient values for a window 172, where the one of: the picture, a slice, the tile, or the tile group includes the reconstructed block of video data 170, and may normalize the gradient values for the window 172.

Video encoder 200 and/or video decoder 300 may apply the determined adaptive loop filter to the reconstructed block of video data 170 to generate a filtered block of video data (406).

In some examples, video encoder 200 and/or video decoder 300 may, in response to the adaptive loop filter utilizing filter supports corresponding to unavailable samples, determine a partial filter from the adaptive loop filter that does not use the filter supports corresponding to the unavailable samples, where the partial filter includes one of: an asymmetric partial filter or a symmetric partial filter.

In some examples, video encoder 200 and/or video decoder 300 may, in response to the adaptive loop filter utilizing filter supports corresponding to unavailable samples, perform mirror padding to replace the filter supports corresponding to the unavailable samples.

In some examples, video encoder 200 and/or video decoder 300 may conditionally disable filtering of a sample of the reconstructed block of video data 170 based at least in part on at least one of: whether determining a gradient values for the sample includes performing a gradient calculation using an unavailable sample or whether determining the gradient values for the window 172 that covers the reconstructed block of video data 170 includes determining one or more gradient values for one or more samples within the window 172 that are outside a boundary of one of: the picture, the slice, the tile, or the tile group, where the reconstructed block of video data 170 is inside the boundary.

In some examples, video encoder 200 and/or video decoder 300 may determine a weighted average of a sample in the reconstructed block and a sample of the filtered block of video data based at least in part on at least one of: whether determining a gradient values for the sample includes performing a gradient calculation using an unavailable sample or whether determining the gradient values for the window 172 that covers the reconstructed block of video data 170 includes determining one or more gradient values for one or more samples within the window 172 that are outside a boundary of one of: the picture, the slice, the tile, or the tile group, where the reconstructed block of video data 170 is inside the boundary.

In some examples, video encoder 200 encode the video data and may store the filtered block of video data in a decoded picture buffer 218. In some examples, video encoder 200 may capture, with a camera, a picture that includes the block of video data.

In some examples, video decoder 300 may decode the video data and may store the filtered block of video data in a decoded picture buffer 314. In some examples, video decoder 300 may display a picture that includes the filtered block of video data.

Illustrative examples of the disclosure include:

Example 1

A method of decoding video data, the method comprising: obtaining a block of samples; determining a gradient for a current sample of the block of samples; and based on the determined gradient, determining a filter for the sample.

Example 2

The method according to Example 1, wherein determining the gradient for the current sample comprises performing a gradient calculation using an unavailable sample.

Example 3

The method according to Example 1, wherein the unavailable sample comprises a sample outside a boundary of one or more of a picture, slice, tile, or tile group that includes the block of samples.

Example 4

The method according to Examples 2 or 3, further comprising: determining a value for the unavailable sample based on a value of an available sample in the block of samples.

Example 5

The method according to Example 4, wherein determining the value for the unavailable sample based on the value of the available sample in the block of samples comprises: determining the available sample to be used based on a direction of the gradient for the current sample.

Example 6

The method according to Example 5, wherein the direction comprises a 45-degree direction.

Example 7

The method according to Example 5, wherein the direction comprises a 135-degree direction.

Example 8

The method according to Example 5, wherein the direction comprises a 90-degree direction.

Example 9

The method according to Example 5, wherein the direction comprises a 0-degree direction.

Example 10

The method according to any of Examples 1-9, wherein the sample is adjacent to a vertical boundary of a picture, slice, tile, or tile group.

Example 11

The method according to any of Examples 1-9, wherein the sample is adjacent to a horizontal boundary of a picture, slice, tile, or tile group.

Example 12

The method according to any of Examples 1-11, wherein the sample is a sample of a sub-block and determining the gradient for the sample comprise determining a gradient for the sub-block.

Example 13

The method according to Example 12, wherein the sub-block comprises a 4×4 block.

Example 14

The method according to any of Examples 1-13, wherein the sample comprises a luma sample.

Example 15

The method according to any of Examples 1-14, further comprising: based on the determined gradient, selecting a filter for the current sample; in response to the selected filter utilizing filter supports corresponding to unavailable samples, filtering the current sample using a partial filter.

Example 16

The method according to Example 15, wherein the partial filter comprises a symmetrical partial filter.

Example 17

The method according to Example 15, wherein the partial filter comprises an asymmetrical partial filter.

Example 18

The method according to any of Examples 1-17, further comprising: filtering the sample using the determined filter.

Example 19

The method according to any of Examples 1-15, wherein the method of decoding is performed as part of a video encoding process.

Example 20

A device for decoding video data, the device comprising: a memory configured to store video data; and one or more processors configured to decode the video data using any technique described in Examples 1-18 and/or any technique described in this disclosure.

Example 21

The device according to Example 20, wherein the device comprises a wireless communication device, further comprising a receiver configured to receive encoded video data.

Example 22

The device according to Example 21, wherein the wireless communication device comprises a telephone handset and wherein the receiver is configured to demodulate, according to a wireless communication standard, a signal comprising the encoded video data.

Example 23

A computer readable storage medium storing instructions that when executed by one or more processors cause the one or more processors to decode the video data using any technique described in Examples 1-19 and/or any technique described in this disclosure.

Example 24

An apparatus for decoding video data, the apparatus comprising: means for decoding the video data using any technique described in Examples 1-19; and/or means for decoding the video data using any technique described in this disclosure.

Example 25

A device for encoding video data, the device comprising: a memory configured to store video data; and one or more processors configured to encode the video data using any technique described in Examples 1-19 and/or any technique described in this disclosure.

Example 26

The device of Example 25, wherein the device comprises a wireless communication device, further comprising a transmitter configured to transmit encoded video data.

Example 27

The device of Example 26, wherein the wireless communication device comprises a telephone handset and wherein the transmitter is configured to modulate, according to a wireless communication standard, a signal comprising the encoded video data.

Example 28

A computer readable storage medium storing instructions that when executed by one or more processors cause the one or more processors to encode the video data using any technique described in Examples 1-19 and/or any technique described in this disclosure.

Example 29

An apparatus for decoding video data, the apparatus comprising:
means for encoding the video data using any technique described in Examples 1-19; and/or means for encoding the video data using any technique described in this disclosure.

Certain aspects of this disclosure have been described with respect to HEVC, extensions of the HEVC, and the developing VVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Also, the techniques could be fully implemented in one or more circuits or logic elements. Processing circuits may be coupled to other components in various ways. For example, a processing circuit may be coupled to other components via an internal device interconnect, a wired or wireless network connection, The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
reconstructing a block of video data to create a reconstructed block of video data;
determining a plurality of gradient values for a window that covers the reconstructed block of video data, the window including samples of the reconstructed block of video data and samples that surround the reconstructed block of video data, the determining the plurality of gradient values including determining gradient values of a plurality of gradient directions for a sample in the reconstructed block of video data, including performing a gradient calculation of a gradient value of a gradient direction for the sample based at least in part on a plurality of neighboring samples that includes an unavailable sample, including using a sample value of an available neighboring sample that corresponds to the unavailable sample in place of the unavailable sample for performing the gradient calculation for the sample, wherein the unavailable sample is outside of one of: a picture, a slice, a tile, or a tile group that includes the reconstructed block of video data;
determining an adaptive loop filter for the reconstructed block of video data based at least in part on the determined plurality of gradient values for the window, including the determined gradient values of the plurality of gradient directions for the sample; and
applying the determined adaptive loop filter to the reconstructed block of video data to generate a filtered block of video data, including determining a weighted average of a particular sample in the reconstructed block of video data and a sample of the filtered block of video data based at least in part on at least one of:
whether determining one or more gradient values for the particular sample includes performing one or more gradient calculations for the particular sample using one or more unavailable samples, or whether the determining the plurality of gradient values for the window that covers the reconstructed block of video data includes determining one or more gradient values for one or more samples within the window that are outside a boundary of one of: the picture, the slice, the tile, or the tile group, wherein the reconstructed block of video data is inside the boundary.

2. The method of claim 1, wherein performing the gradient calculation for the sample, including using the sample value of the available neighboring sample that corresponds to the unavailable sample comprises:

performing the gradient calculation for the sample using the available neighboring sample along the gradient direction of a gradient of the sample in place of the unavailable sample.

3. The method of claim 1, wherein performing the gradient calculation for the sample, including using the sample value of the available neighboring sample that corresponds to the unavailable sample comprises:

performing mirror padding to determine the available neighboring sample that corresponds to the unavailable sample; and performing the gradient calculation for the sample using the available neighboring sample.

4. The method of claim 1, wherein determining the plurality of gradient values for the window that covers the reconstructed block of video data comprises:

replacing unavailable gradient values for samples within the window that are outside a boundary of one of: the picture, the slice, the tile, or the tile group with one or more gradient values that are inside the boundary, wherein the one of: the picture, the slice, the tile, or the tile group includes the reconstructed block of video data.

5. The method of claim 4, wherein the boundary comprises a horizontal boundary, and wherein replacing the unavailable gradient values for the samples within the window that are outside the boundary with the one or more gradient values that are inside the boundary comprises:

determining a gradient value for a sample within the window and outside the horizontal boundary as a nearest gradient value of a sample inside the horizontal boundary that is on the same column as the sample within the window and outside the horizontal boundary.

6. The method of claim 4, wherein the boundary comprises a vertical boundary, and wherein replacing the unavailable gradient values for the samples within the window that are outside the boundary with the one or more gradient values that are inside the boundary comprises:

determining a gradient value for a sample within the window and outside the vertical boundary as a nearest gradient value of a sample inside the vertical boundary that is on the same row as the sample within the window and outside the vertical boundary.

7. The method of claim 4, wherein replacing the unavailable gradient values for the samples within the window that are outside the boundary with the one or more gradient values that are inside the boundary comprises:

determining a diagonal gradient value for a sample within the window and outside the boundary as a nearest diagonal gradient value of a sample inside the boundary that is on the same gradient direction as the diagonal gradient value of the sample within the window and outside the boundary.

8. The method of claim 4, wherein replacing the unavailable gradient values for the samples within the window that are outside the boundary with the one or more gradient values that are inside the boundary comprises:

determining additional gradient values for additional samples within the reconstructed block of video data to replace the unavailable gradient values for the samples within the window that are outside the boundary.

9. The method of claim 1, wherein determining the plurality of gradient values for the window that covers the reconstructed block of video data comprises:

refraining from including unavailable gradient values for samples within the window that are outside a boundary of one of: the picture, the slice, the tile, or the tile group in the gradient values for the window, wherein the one of: the picture, the slice, the tile, or the tile group includes the reconstructed block of video data; and normalizing the plurality of gradient values for the window.

10. The method of claim 1, wherein determining the adaptive loop filter for the reconstructed block of video data based at least in part on the determined plurality of gradient values for the window comprises:

in response to the adaptive loop filter utilizing filter supports corresponding to unavailable samples, determining a partial filter from the adaptive loop filter that does not use the filter supports corresponding to the unavailable samples, wherein the partial filter comprises one of: an asymmetric partial filter or a symmetric partial filter.

11. The method of claim 1, wherein determining the adaptive loop filter for the reconstructed block of video data based at least in part on the determined plurality of gradient values for the window comprises:

in response to the adaptive loop filter utilizing filter supports corresponding to unavailable samples, performing mirror padding to replace the filter supports corresponding to the unavailable samples.

12. The method of claim 1, wherein applying the determined adaptive loop filter to the reconstructed block of video data to generate the filtered block of video data further comprises:

conditionally disabling filtering of a particular sample of the reconstructed block of video data based at least in part on at least one of:

whether determining one or more gradient values for the particular sample includes performing one or more gradient calculations for the particular sample using one or more unavailable samples, or whether determining the gradient values for the window that covers the reconstructed block of video data includes determining one or more gradient values for one or more samples within the window that are outside a boundary of one of: the picture, the slice, the tile, or the tile group, wherein the reconstructed block of video data is inside the boundary.

13. The method of claim 12, wherein conditionally disabling filtering of a particular sample of the reconstructed block of video data is further based on a threshold.

14. An apparatus configured to code video data, the apparatus comprising:

a memory configured to store a block of video data; and one or more processors, implemented in circuitry, in communication with the memory, the one or more processors configured to:

reconstruct the block of video data to create a reconstructed block of video data;

determine a plurality of gradient values for a window that covers the reconstructed block of video data, the window including samples of the reconstructed block of video data and samples that surround the reconstructed block of video data, wherein to determine the plurality of gradient values, the one or more processors are further configured to determine gradient values of a plurality of gradient directions for a sample in the reconstructed block of video data, wherein to determine the gradient values of the plurality of gradient directions, the one or more processors are further configured to perform a gradient calculation of a gradient value of a gradient direction for the sample based at least in part on a plurality of neighboring samples that includes an unavailable sample, wherein to perform the gradient calculation, the one or more processors are further configured to use a sample value of an available neighboring sample that corresponds to the unavailable sample in place of the unavailable sample for the performance of the gradient calculation for the sample, wherein the unavailable sample is outside of one of: a picture, a slice, a tile, or a tile group that includes the reconstructed block of video data;

determine an adaptive loop filter for the reconstructed block of video data based at least in part on the determined plurality of gradient values for the window, including the determined gradient values of the plurality of gradient directions; and apply the determined adaptive loop filter to the reconstructed block of video data to generate a filtered block of video data, wherein to apply the determined adaptive loop filter, the one or more processors are further configured to determine a weighted average of a particular sample in the reconstructed block of video data and a sample of the filtered block of video data based at least in part on at least one of:

whether a determination of one or more gradient values for the particular sample includes a performance of one or more gradient calculations for the particular sample using one or more unavailable samples, or whether the determination of the plurality of gradient values for the window that covers the reconstructed block of video data includes a determination of one or more gradient values for one or more samples within the window that are outside a boundary of one of: the picture, the slice, the tile, or the tile group, wherein the reconstructed block of video data is inside the boundary.

15. The apparatus of claim 14, wherein to perform the gradient calculation for the sample, including using the sample value of the available neighboring sample that corresponds to the unavailable sample, the one or more processors are configured to:

perform the gradient calculation for the sample using the available neighboring sample along the gradient direction of a gradient of the sample in place of the unavailable sample.

16. The apparatus of claim 14, wherein to perform the gradient calculation for the sample, including using the sample value of the available neighboring sample that corresponds to the unavailable sample, the one or more processors are configured to:

perform mirror padding to determining the available neighboring sample that corresponds to the unavailable sample; and perform the gradient calculation for the sample using the available neighboring sample.

17. The apparatus of claim 14, wherein to determine the plurality of gradient values for the window that covers the reconstructed block of video data, the one or more processors are further configured to:

replace unavailable gradient values for samples within the window that are outside a boundary of one of: the picture, the slice, the tile, or the tile group with one or more gradient values that are inside the boundary, wherein the one of: the picture, the slice, the tile, or the tile group includes the reconstructed block of video data.

18. The apparatus of claim 17, wherein the boundary comprises a horizontal boundary, and wherein to replace the unavailable gradient values for the samples within the window that are outside the boundary with the one or more gradient values that are inside the boundary, the one or more processors are further configured to:

determine a gradient value for a sample within the window and outside the horizontal boundary as a nearest gradient value of a sample inside the horizontal boundary that is on the same column as the sample within the window and outside the horizontal boundary.

19. The apparatus of claim 17, wherein the boundary comprises a vertical boundary, and wherein to replace the unavailable gradient values for the samples within the window that are outside the boundary with the one or more gradient values that are inside the boundary, the one or more processors are further configured to:

determine a gradient value for a sample within the window and outside the vertical boundary as a nearest gradient value of a sample inside the vertical boundary that is on the same row as the sample within the window and outside the vertical boundary.

20. The apparatus of claim 17, wherein to replace the unavailable gradient values for the samples within the window that are outside the boundary with the one or more gradient values that are inside the boundary, the one or more processors are further configured to:

determine a diagonal gradient value for a sample within the window and outside the boundary as a nearest diagonal gradient value of a sample inside the boundary that is on the same gradient direction as the diagonal gradient value of the sample within the window and outside the boundary.

21. The apparatus of claim 17, wherein to replace the unavailable gradient values for the samples within the window that are outside the boundary with the one or more gradient values that are inside the boundary, the one or more processors are further configured to:

determine additional gradient values for additional samples within the reconstructed block of video data to replace the unavailable gradient values for the samples within the window that are outside the boundary.

22. The apparatus of claim 14, wherein to determine the plurality of gradient values for the window that covers the reconstructed block of video data, the one or more processors are further configured to:

refrain from including unavailable gradient values for samples within the window that are outside a boundary of one of: the picture, the slice, the tile, or the tile group in the gradient values for the window, wherein the one of: the picture, the slice, the tile, or the tile group includes the reconstructed block of video data; and normalize the plurality of gradient values for the window.

23. The apparatus of claim 14, wherein to determine the adaptive loop filter for the reconstructed block of video data based at least in part on the determined plurality of gradient values for the window, the one or more processors are further configured to:
  in response to the adaptive loop filter utilizing filter supports corresponding to unavailable samples, determine a partial filter from the adaptive loop filter that does not use the filter supports corresponding to the unavailable samples, wherein the partial filter comprises one of: an asymmetric partial filter or a symmetric partial filter.

24. The apparatus of claim 14, wherein to determine the adaptive loop filter for the reconstructed block of video data based at least in part on the determined plurality of gradient values for the window, the one or more processors are further configured to:
  in response to the adaptive loop filter utilizing filter supports corresponding to unavailable samples, perform mirror padding to replace the filter supports corresponding to the unavailable samples.

25. The apparatus of claim 14, wherein to apply the determined adaptive loop filter to the reconstructed block of video data to generate the filtered block of video data, the one or more processors are further configured to:
  conditionally disable filtering of a particular sample of the reconstructed block of video data based at least in part on at least one of:
    whether a determination of one or more gradient values for the particular sample includes a performance of one or more gradient calculations for the particular sample using one or more unavailable samples, or
    whether a determination of the gradient values for the window that covers the reconstructed block of video data includes a determination of one or more gradient values for one or more samples within the window that are outside a boundary of one of: the picture, the slice, the tile, or the tile group, wherein the reconstructed block of video data is inside the boundary.

26. The apparatus of claim 14, wherein the apparatus comprises one or more of a camera, a computer, a mobile device, a broadcast receiver device, or a set-top box.

27. The apparatus of claim 25, wherein to conditionally disable filtering of a particular sample of the reconstructed block of video data is further based on a threshold.

28. A non-transitory computer-readable storage medium storing instructions that, when executed, cause one or more processors configured to:
  reconstruct a block of video data to create a reconstructed block of video data;
  determine a plurality of gradient values for a window that covers the reconstructed block of video data, the window including samples of the reconstructed block of video data and samples that surround the reconstructed block of video data, wherein to determine the plurality of gradient values, the one or more processors are further configured to determine gradient values of a plurality of gradient directions for a sample in the reconstructed block of video data, wherein to determine the gradient values of the plurality of gradient directions, the one or more processors are further configured to perform a gradient calculation of a gradient value of a gradient direction for the sample based at least in part on a plurality of neighboring samples that includes an unavailable sample, wherein to perform the gradient calculation, the one or more processors are further configured to use a sample value of an available neighboring sample that corresponds to the unavailable sample in place of the unavailable sample for the performance of the gradient calculation for the sample, wherein the unavailable sample is outside of one of: a picture, a slice, a tile, or a tile group that includes the reconstructed block of video data;
  determine an adaptive loop filter for the reconstructed block of video data based at least in part on the determined plurality of gradient values for the window, including the determined gradient values of a plurality of gradient directions for the sample; and
  apply the determined adaptive loop filter to the reconstructed block of video data to generate a filtered block of video data, wherein to apply the determined adaptive loop filter, the one or more processors are further configured to determine a weighted average of a particular sample in the reconstructed block of video data and a sample of the filtered block of video data based at least in part on at least one of:
    whether a determination of one or more gradient values for the particular sample includes a performance of one or more gradient calculations for the particular sample using one or more unavailable samples, or
    whether the determination of the plurality of gradient values for the window that covers the reconstructed block of video data includes a determination of one or more gradient values for one or more samples within the window that are outside a boundary of one of: the picture, the slice, the tile, or the tile group, wherein the reconstructed block of video data is inside the boundary.

* * * * *